(12) United States Patent
Phillips

(10) Patent No.: US 8,631,906 B2
(45) Date of Patent: Jan. 21, 2014

(54) COMPACT CLIMBING TREE STAND WITH TELESCOPING FOOTBED AND A PLURALITY OF UTILIZATION MODES

(76) Inventor: Robert A. Phillips, Destin, FL (US)

( * ) Notice: Subject to any disclaimer, the term of this patent is extended or adjusted under 35 U.S.C. 154(b) by 310 days.

(21) Appl. No.: 12/879,260

(22) Filed: Sep. 10, 2010

(65) Prior Publication Data

US 2012/0061180 A1    Mar. 15, 2012

(51) Int. Cl.
*E04G 3/24*    (2006.01)
(52) U.S. Cl.
USPC .......................................... 182/187; 182/136
(58) Field of Classification Search
USPC .......................... 182/135, 136, 187
See application file for complete search history.

(56) References Cited

U.S. PATENT DOCUMENTS

| | | | |
|---|---|---|---|
| 4,417,645 A | | 11/1983 | Untz |
| 4,469,195 A | * | 9/1984 | Sartain .......................... 182/206 |
| 5,103,935 A | | 4/1992 | Amacker |
| 5,265,780 A | * | 11/1993 | Matthews et al. ............. 224/155 |
| 5,316,104 A | * | 5/1994 | Amacker ....................... 182/187 |
| 5,339,922 A | * | 8/1994 | Beechler ........................ 182/188 |
| 5,638,916 A | * | 6/1997 | Schneider ..................... 182/206 |
| 5,641,036 A | | 6/1997 | Maxwell |
| 6,308,800 B1 | * | 10/2001 | Graham, Jr. ................... 182/136 |
| 7,971,685 B2 | * | 7/2011 | Simone et al. ................ 182/133 |

* cited by examiner

*Primary Examiner* — Katherine Mitchell
*Assistant Examiner* — Daniel Cahn
(74) *Attorney, Agent, or Firm* — Husch Blackwell LLP

(57) ABSTRACT

A climbing tree stand for enabling a user to climb a tree or other substantially vertical object to be climbed adaptable for use in a plurality of different utilization modes including a tree stand mode, a backpack mode, and a chair mode, the tree stand including a seat platform assembly having a pair of tree engaging members associated therewith movable between a first storage position and a second operative position for selectively engaging the object to be climbed, a footbed assembly having a pair of tree engaging members associated therewith movable between a first storage position and a second operative position for likewise selectively engaging the object to be climbed, and a pair of cable members, each cable member being respectively adjustably attachable to the seat platform assembly and the footbed assembly. The footbed assembly is further adjustable to change the overall length thereof and is adaptable for attachably receiving the seat platform assembly in a plurality of different orientations to achieve the backpack mode and the chair mode.

28 Claims, 12 Drawing Sheets

US 8,631,906 B2

COMPACT CLIMBING TREE STAND WITH TELESCOPING FOOTBED AND A PLURALITY OF UTILIZATION MODES

BACKGROUND OF INVENTION

The present invention relates to a climbing tree stand for use by hunters and/or observers of wildlife and, more particularly, to a compact climbing tree stand construction having a telescoping footbed and being configurable to achieve a plurality of different utilization modes including a climbing tree stand mode, a backpack mode and a chair mode.

Climbing tree stands are routinely used by hunters and observers of wildlife as a means of elevated concealment above the wildlife target area. Because wildlife can see, smell and/or detect movement of a person at ground level, elevated platforms are commonly used by hunters and wildlife observers as a means to conceal themselves from the line of sight of the wildlife and to likewise conceal any slight body movements or noise generated by a person which may alert the wildlife to that person's location, or to possible danger. To meet this need, a wide variety of different types of tree stands exist in the prior art in order to achieve an elevated position above the wildlife target area. One type of tree stand commonly used for this purpose is a climbing tree stand which is used to climb a tree, pole or other substantially vertical object in order to be perched at a desired elevated position over the wildlife target area. Climbing tree stands typically include two support assemblies, both of which must be carried or otherwise transported to the wildlife target area. One support assembly provides a seat for supporting a user's main body which and the other support assembly provides a platform for supporting the user's feet. Each assembly is separate and apart from each other and includes some type of tree engaging mechanism for individually maneuvering each respective assembly up and down the tree or other substantially vertical object. Climbing tree stands employ leverage forces in their operation and each assembly is operated by selectively shifting the user's body weight from one assembly to the other assembly such that a leverage force is created on the assembly supporting the user's weight and no significant force is applied to the other assembly permitting it to be slidably moved along the tree or other substantially vertical object to be climbed. As a result, a user can easily climb up and down a tree trunk having little or no limb obstruction with little effort by alternately standing on the foot assembly which applies leverage to that assembly so as to engage such assembly with the tree and thereafter raising or lowering the seat assembly along the tree trunk as desired. Once the seat assembly is properly positioned at a different elevated location, the user then applies his/her weight to the seat assembly thereby applying leverage to that assembly so as to engage that assembly with the tree and thereafter raises or lowers the foot assembly as desired by either drawing his/her legs up under the seat assembly or extending his/her legs downwardly away from the seat assembly to position the foot assembly at a different elected position. A user repeats this process until the desired height is reached or until the user has lowered himself/herself to the ground. The use and operation of climbing tree stands are well-known to a person skilled in the art.

Typical prior art climbing tree stands are disclosed in U.S. Pat. Nos. 4,417,645; 5,103,935; 5,265,780; and 5,641,036. Although the above-referenced known climbing tree stands incorporate different structures and different tree engaging mechanisms for accomplishing similar tasks, none of these prior art devices disclose a telescoping footbed, and none disclose a pair of assemblies which can be arranged in a variety of different operative configurations relative to each other to achieve a climbing tree stand mode, a backpack mode, and a chair mode as will be hereafter further explained.

It is therefore desirable to provide a compact climbing tree stand construction which can be manipulated and configured to achieve a climbing tree stand mode, a backpack mode, and a chair mode, and wherein the footbed assembly includes telescoping means for extending the footbed to accommodate users of different height, weight, build and stature and to provide additional storage space for hunting and/or observing equipment such as backpacks, camera cases, game calling equipment, and the like. It is also desirable to provide a compact climbing tree stand construction which incorporates tree engaging members which can be moved from an operative position to a storage position when the tree stand is being used in its backpack mode and in its chair mode.

SUMMARY OF INVENTION

The present invention teaches the construction and operation of several embodiments of a portable compact climbing tree stand adaptable for use in a plurality of different utilization modes including a climbing tree stand mode, a backpack mode, and a chair mode. In one aspect of the present invention, the present climbing tree stand includes a seat platform assembly and a footbed assembly, each assembly including means for adjustably receiving and holding a flexible cable or chain member for encircling the tree or other object to be climbed. Each respective flexible cable member can be adjustably positioned and located around a tree or other object to be climbed and attached to each assembly so as to enable its associated assembly to be physically engaged with the object to be climbed in a conventional manner such that leverage forces can be applied to each respective assembly to accomplish the climbing or descending of each respective assembly. Each respective assembly likewise includes a pair of pivotable tree engaging members which are movable between a first storage position and a second tree engaging position, the jaws or teeth associated with each pair of pivotally movable members engaging and penetrating the bark of a tree or other object to be climbed when such members are positioned in their operative second position. These pivotable or otherwise movable tree engaging members are positioned and located on each respective assembly such that when the respective seat platform assembly and footbed assembly are operatively positioned adjacent a tree or other object to be climbed in the climbing tree stand mode, and when each respective pair of tree engaging members are pivotally moved to their second operative position, the tree engaging members will engage the bark of a tree or other pole or object to be climbed. Engagement of the tree engaging members with the object to be climbed and the adjustable positioning of the flexible cable or chain member around the tree or other object to be climbed stabilizes each respective assembly and attaches each respective assembly to the object to be climbed as well be hereinafter further explained. The pivotable tree engaging members in conjunction with the flexible cable members operate and cooperate with each other to enable a user to employ leverage forces through the respective assemblies for individually maneuvering each respective assembly up and down the object to be climbed.

The seat platform assembly of the present invention likewise includes a pair of extendable and retractable extension members which are positioned and located in opposed relationship to the flexible cable member and function as handle members for facilitating the movement of the seat platform assembly up and down the object to be climbed when in its climbing tree stand mode. The extension members are adjustably positionable between a fully retracted position when not in use and a fully extendable position when used as handle members in the tree stand/climbing mode. The extension members likewise function as engagement means for engaging the footbed assembly when the present tree stand is used in either its backpack mode or its chair mode. Pin members or other cooperatively engageable means are utilized to hold each respective extension member at any one of a plurality of predetermined extendable positions between its fully retracted position and its fully extended position depending upon the particular application and mode of operation desired, and depending upon the height, weight, build and/or stature of the user. The seat platform assembly is likewise configured so as to allow a conventional web type seat member or other seat means to be removably attachable to the seat platform assembly in a conventional manner when the seat platform assembly is used in the climbing tree stand mode. Various types of seat mechanisms and strap arrangements can be utilized with the present seat platform assembly to provide a stable seat supporting structure for carrying the weight of a user when used in the tree stand mode.

The footbed assembly of the present invention includes a telescoping footbed which is positionable between a fully retracted position and a fully extended position thereby enabling a user to adjust the overall length of the footbed depending upon the height, weight, build and/or stature of the user. In this regard, the extendable footbed can be securely locked in any one of a plurality of extended positions through the use of similar pin members or other cooperatively engageable means, or through friction forces. The present footbed assembly likewise includes means for securing the feet of a user on the footbed assembly during the tree stand climbing mode as well as means for cooperatively engaging the seat platform assembly in at least two different orientations when the present tree stand is used in its backpack mode or in its chair mode. When the present seat platform assembly and footbed assembly are maneuvered and configured in its backpack mode, a conventional backpack can be securely fastened to the attached assemblies using the strap members and belt members associated with a typical backpack such that when the shoulder straps of a typical backpack are positioned in a carrying mode on a user, the attached seat platform and footbed assemblies are likewise positioned and located in a comfortable orientation on the back of a user for carrying not only the present tree stand assembly in its backpack mode into any area of interest including the wildlife target area, but also a conventional backpack and all of the necessary equipment a user may need at the area of interest. When used in its backpack mode, a user can easily transport both the present climbing tree stand, a conventional backpack, and other equipment into any area of interest while keeping the arms and hands of the user free for other tasks. In addition, all necessary equipment for either hunting or observing wildlife, or any other application, can be likewise easily stored within the backpack or attached to the backpack mode framework for transport to the area of interest. Once a user reaches a particular area of interest, the backpack can be disengaged from backpack mode configuration and the seat platform assembly and footbed assembly can be disengaged from each other and used in a conventional manner in its climbing tree stand mode or in its chair mode as will be hereinafter further explained.

Still further, when any particular area of interest is reached by a user of the present device, the backpack can again be disengaged from the backpack mode configuration of the present device and the seat platform assembly and footbed assembly can be disengaged and reconfigured in another attachment arrangement so as to achieve the chair mode. In this particular configuration, the seat platform assembly and footbed assembly are repositioned and reattached in an orientation which yields a chair which can be positioned on the ground or adjacent a tree or other substantially vertical object for use by the user as a conventional chair. This mode is particularly adaptable for turkey hunting when a user traditionally sits on the ground and leans against the trunk of a tree. When used in its chair mode, the present device provides a comfortable seating arrangement for a user with a frame structure and associated cushion for comfortably supporting both the buttocks region and the back region of a user as compared to normally sitting on the ground and leaning against a tree, or sitting on a backless stool or bucket when turkey hunting or other ground observing applications. The seat platform assembly can likewise be cooperatively engaged with the footbed assembly in at least two different orientations when the present tree stand is used in its chair mode.

The present compact climbing tree stand therefore enables a user to configure the seat platform assembly and footbed assembly of the present device in a backpack mode thereby enabling a user to not only comfortably transport the portable tree stand into the particular area of interest, but it also enables the user to carry all of the necessary equipment for hunting and/or observing wildlife into the target area. Once the target area is reached, the present climbing tree stand can be disassembled from its backpack mode and can be used either as a climbing tree stand in its tree stand mode, or as a ground resting chair in its chair mode depending upon the particular application at hand. If the user is, for example, going to deer hunt, the present seat platform assembly and footbed assembly will be used in its conventional tree stand mode for climbing a tree, pole or other substantially vertical object to a desired elevated position over the wildlife target area. On the other hand, if the user is going to turkey hunt or otherwise remain on the ground in an observing mode, the present seat platform assembly and footbed assembly can be reconfigured into its chair mode for providing a comfortable ground chair arrangement which can be used in a turkey hunting application or other applications.

BRIEF DESCRIPTION OF DRAWINGS

For a better understanding of the present invention, reference may be made to the accompanying drawings.

DETAILED DESCRIPTION

Figure 1:
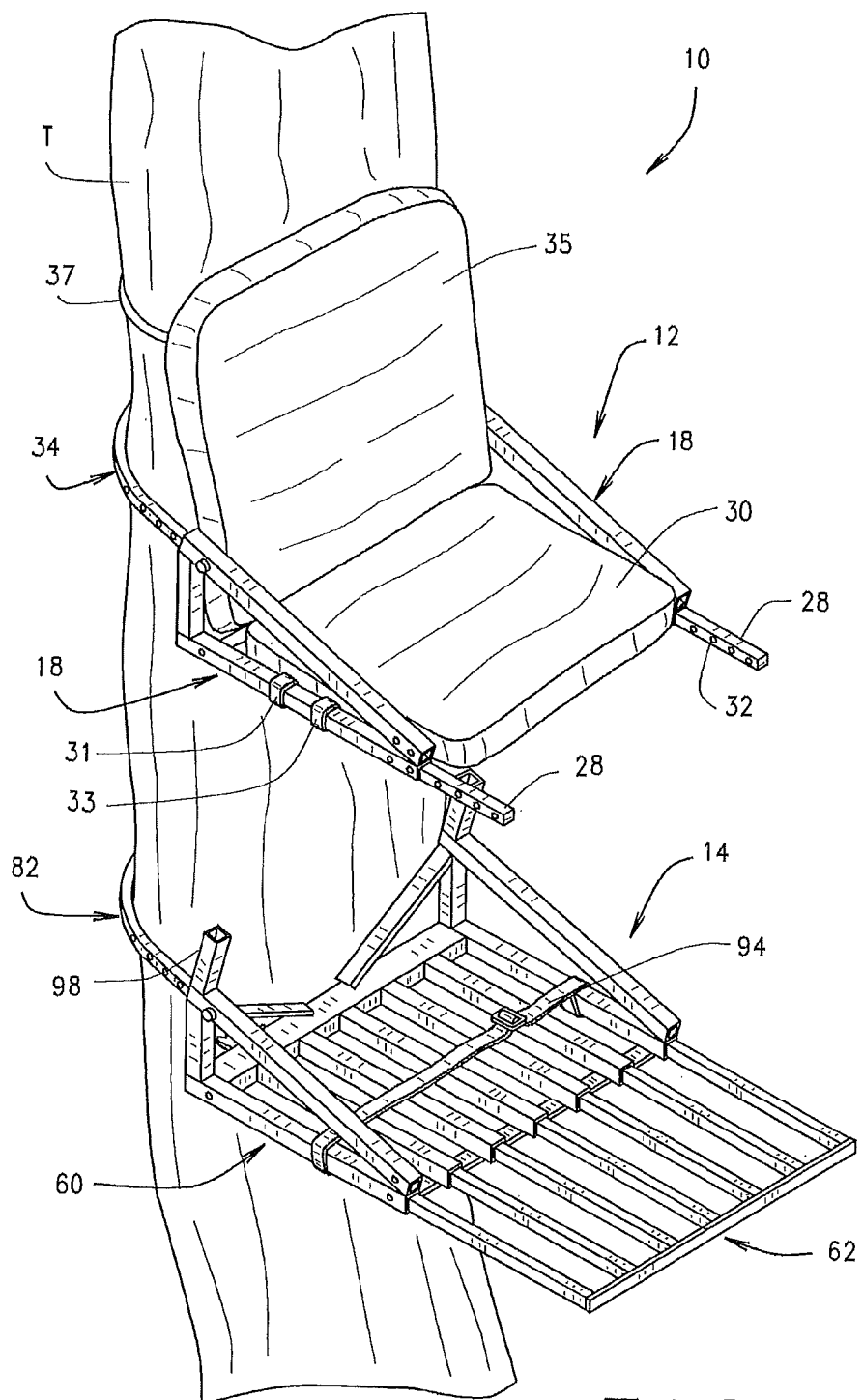
FIG. 1 is a perspective view of the present climbing tree stand positioned and oriented on a tree trunk in its climbing tree stand mode.
Figure 15:
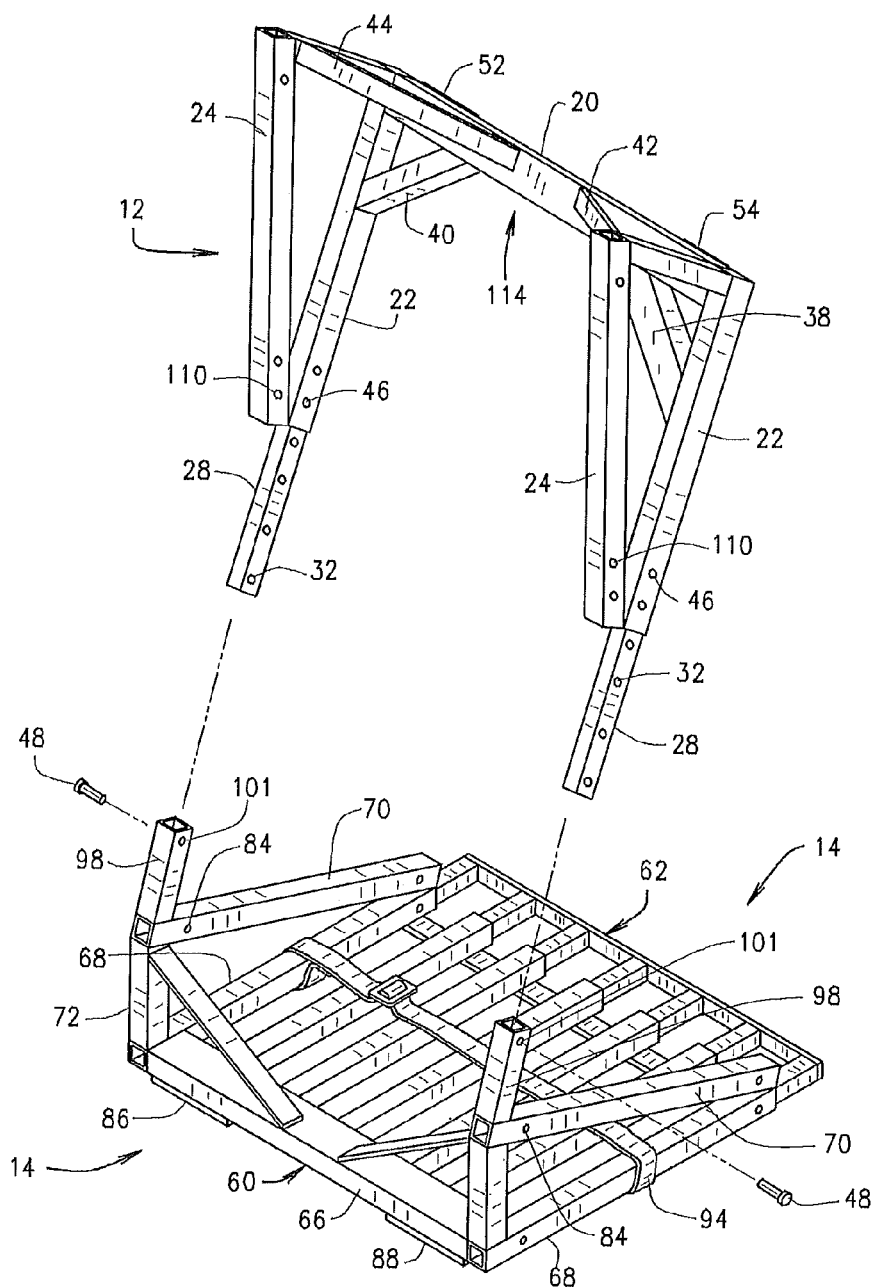
FIG. 15 is an exploded perspective view showing the present seat platform assembly and footbed assembly positioned in a first orientation for engagement to achieve the chair mode.
Figure 16:
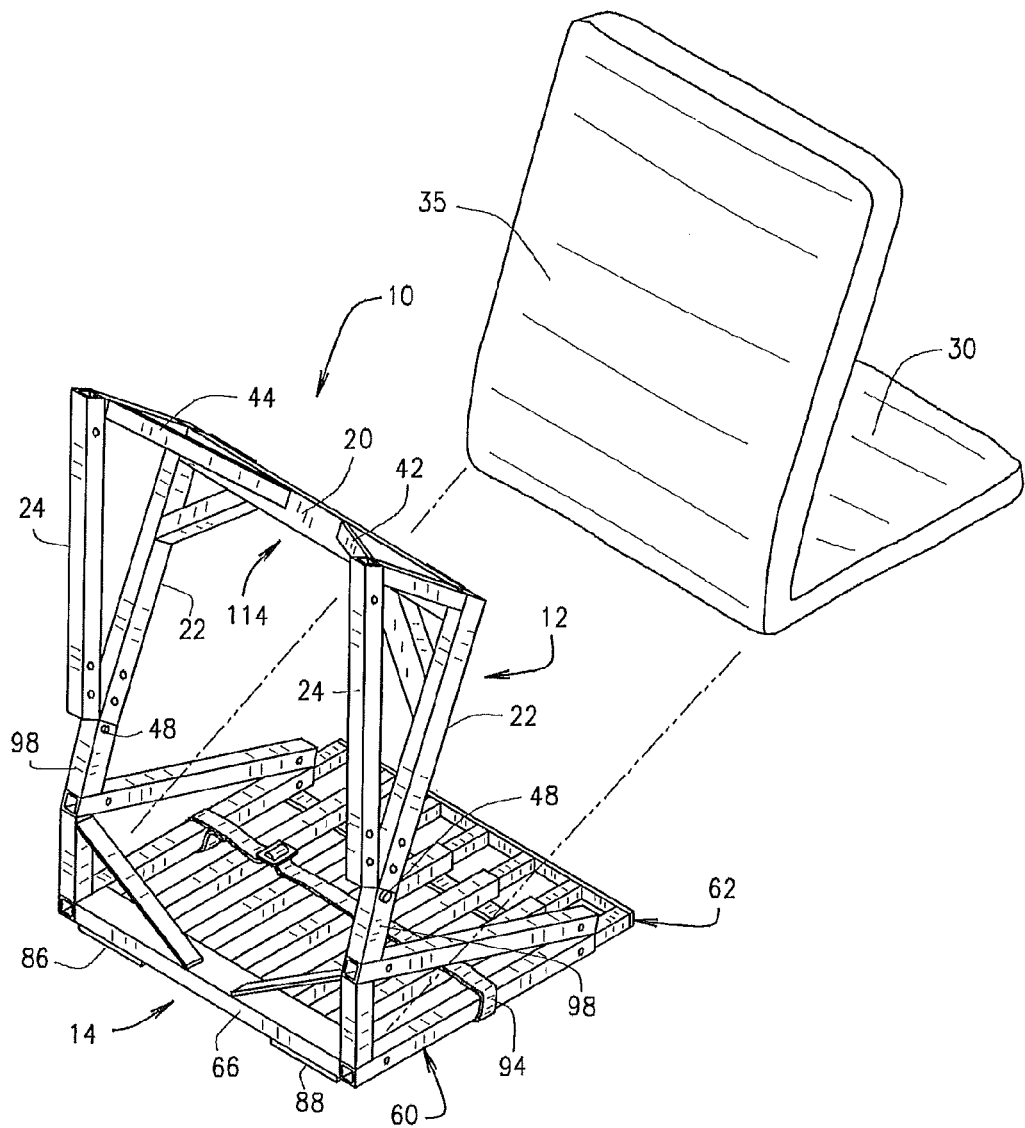
FIG. 16 is a perspective view similar to FIG. 15 showing the present seat platform assembly and footbed assembly engaged to achieve the chair mode.

Referring to the drawings more particularly by reference numbers, where in like numerals refer to like parts, number 10 in FIG. 1 identifies one embodiment of a compact climbing tree stand constructed according to the teachings of the present invention. The present tree stand 10 is illustrated in FIG. 1 in its tree stand mode attached to a tree trunk T or other substantially vertical object to be climbed and includes basically two separate assemblies, namely, a tree platform assembly 12 and a footbed assembly 14. As will be hereinafter further explained, the present assemblies 12 and 14 can be positioned and oriented relative to each other to achieve the tree stand mode and climbing mode as illustrated in FIG. 1, the backpack mode as illustrated in FIGS. 10-14, and the chair mode as illustrated in FIGS. 15 and 16. Although the present climbing tree stand 10 will be discussed herein with respect to being attached to and ascending/descending a tree trunk T as illustrated in FIG. 1, it is recognized and anticipated that the present climbing tree stand can be utilized with any substantially vertical object such as a telephone pole or other object to be climbed. It is also recognized and anticipated that the present climbing tree stand 10 constructed according to the teachings of the present invention can likewise be fashioned into a variety of different sizes and shapes other than those illustrated herein and that other components associated with the present assemblies may likewise be correspondingly shaped to conform to the shape of the overall unit without departing from the teachings and practice of the present invention so long as the main features of the present invention as will be hereinafter discussed are achieved including providing a climbing tree stand which can be configured to achieve the different plurality of utilization modes discussed herein including a tree stand mode, a backpack mode, and a chair mode.

Figure 2:
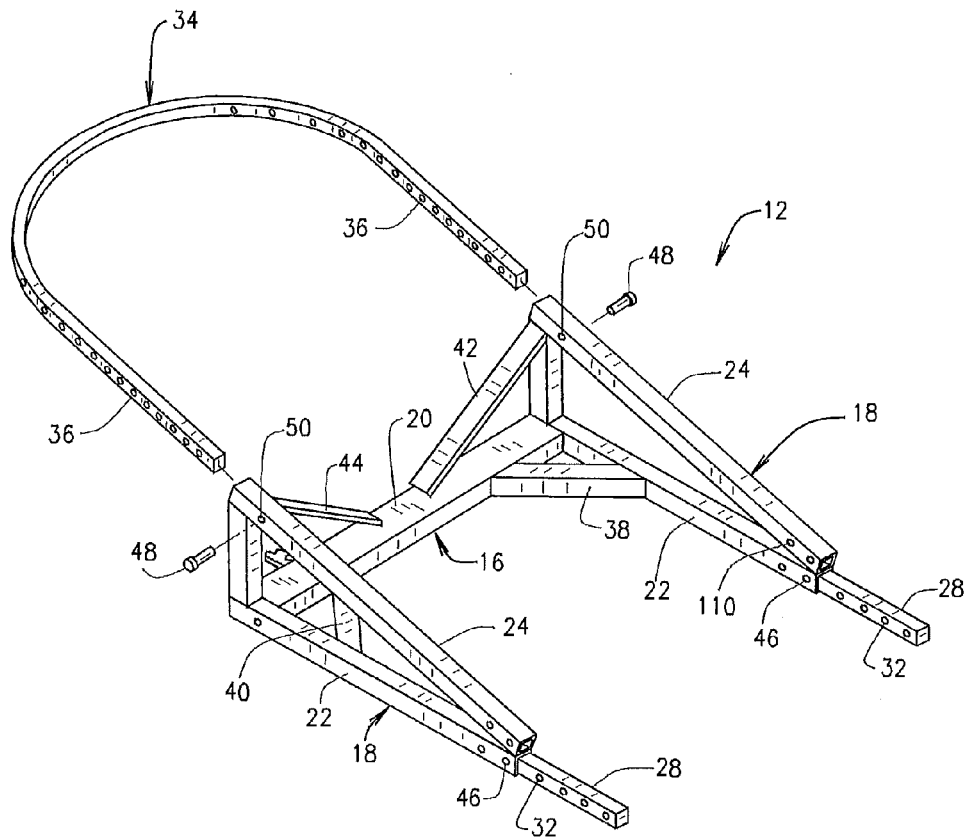
FIG. 2 is an exploded perspective view of the seat platform assembly of FIG. 1 without the seat cushion.
Figure 3:
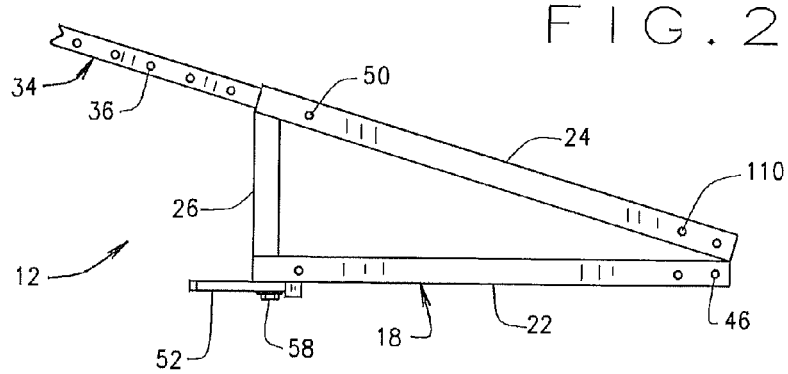
FIG. 3 is a side elevational view of the seat platform assembly of FIG. 2.
Figure 4:
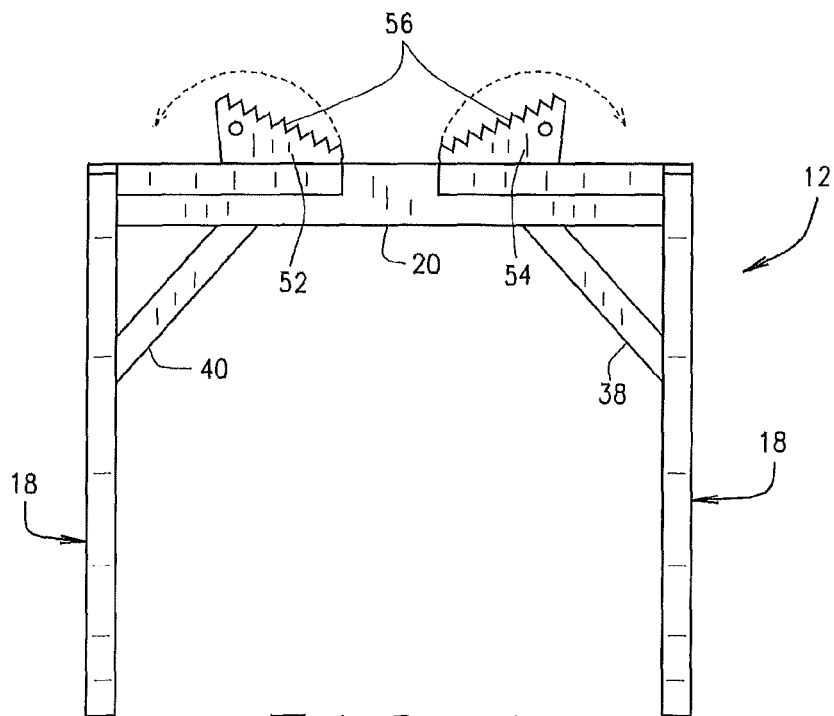
FIG. 4 is a top plan form view of the seat platform assembly of FIGS. 2 and 3 without the flexible cable member showing the pivotable tree engaging members positioned in their operative tree engaging position.
Figure 5:
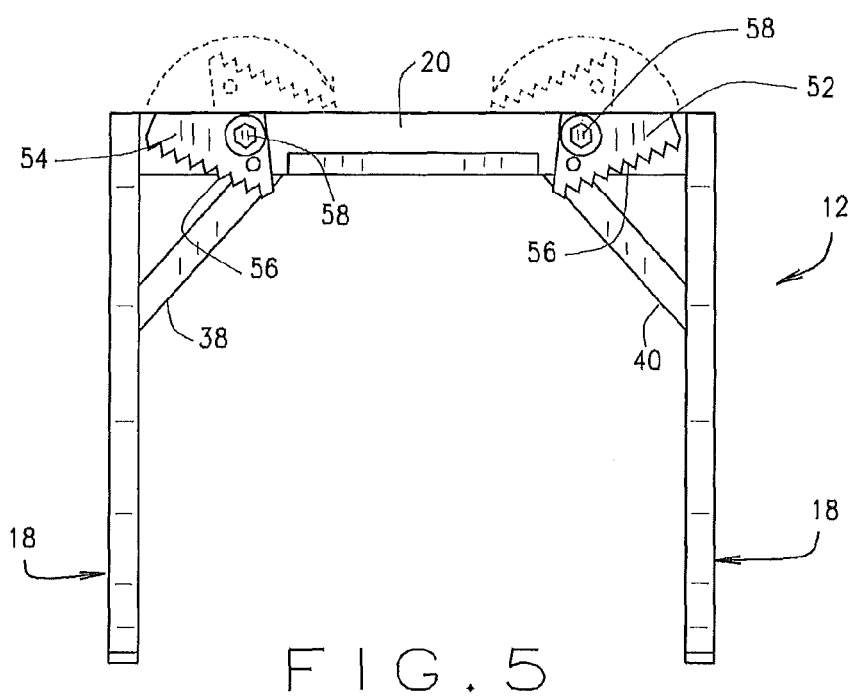
FIG. 5 is a bottom plan form view of the seat platform assembly similar to FIG. 4 showing the tree engaging members positioned in their storage position.

The seat platform assembly 12 of the present unit 10 is best illustrated in FIGS. 2-5 and includes a substantially U-shaped frame assembly 16 as best illustrated in FIGS. 2, 4 and 5. The U-shaped frame assembly 16 includes a pair of spaced apart side frame assemblies 18 connected together by a transverse member 20. Each side frame assembly 18 is substantially triangular in shape as best illustrated in FIG. 3 and includes frame members 22, 24 and 26. Frame members 22 and 24 are angularly related to each other as illustrated in FIGS. 2 and 3 and are connected together at one end portion respectively thereof by frame member 26. Frame members 22 and 24 are substantially hollow members having at least an internal cavity or passageway associated with each opposite end portion thereof adaptable for receiving other components of the present assembly 10 such as extension members 28 and a flexible cable or chain member 34 as will be hereinafter further explained. The substantially U-shaped frame assembly 16 may likewise include additional support and/or bracing members such as members 38, 40, 42 and 44 to provide additional strength and rigidity to the overall seat platform assembly 12.

Extension members 28 are telescopingly received within the respective frame members 22 associated with each respective side frame assembly 18 as best illustrated in FIG. 2. Each extension member 28 is slidably adjustably positionable within the one end portion of the frame member 22 and each function as a handle member for a user when using the present tree stand 10 in its tree stand and/or climbing mode. Each extension member 28 includes a plurality of openings 32 positioned in spaced apart relationship so as to engage any conventional means such as a pin member or a spring loaded projection member associated with frame member 22 or separately provided. In this regard, frame member 22 may include one or more pairs of openings 46 for receiving a pin member such as the pin member 48 illustrated in FIG. 2 such that when any one of the plurality of openings 32 associated with one of the extension members 28 is positioned in registration with the corresponding openings 46 associated with frame member 22, a pin member such as pin member 48 can be slidably positioned through the aligned openings 46 and 32 to hold the extension member at any one of a plurality of different extension positions. This enables a user to adjustably position each respective extension member 28 at a desired extension position anywhere between a fully retracted position wherein each extension member 28 is substantially fully housed and enclosed within each respective frame member 22, and a fully extended position wherein the last opening 32 associated with each extension member 28 is placed in registration with the opening or openings 46. It is also recognized that one end portion of each respective extension member 28 may include a stop mechanism for preventing each extension member 28 from being completely removed from its respective frame member 22. Still further, it is recognized and anticipated that a convention spring-loaded projection member (not disclosed) may be associated with the interior portion of each respective frame member 22 for slidably releasing and engaging each respective extension member 28 at any one of its plurality of openings 32 to adjustably position each respective extension member 28. Still further, other conventional means can likewise be utilized to adjustably move and hold each respective extension member 28 at the desired extension position. The extension members 28 are extended to a desired extension position to aid in moving the seat platform assembly 12 up and down the tree trunk T or other object to be climbed as will be hereinafter further explained.

A flexible cable or chain member 34 is utilized to attach the seat platform assembly 12 to a particular tree trunk T as illustrated in FIG. 1. Each opposite end portion of the flexible cable member 34 is cooperatively received within a corresponding end portion of each of the frame members 24 and each opposite end portion includes a plurality of spaced apart openings 36 as best illustrated in FIG. 2. The telescoping relationship between the flexible cable member 34 and the frame members 24 as well as the plurality of openings 36 allow the flexible cable member 34 to be adjustably positioned and located at least partially around a particular tree trunk T based upon the size and diameter of the tree trunk or other object to be climbed. This adjustability is well-known in the art and is necessary to physically engage the seat platform assembly 12 with the particular object to be climbed. In this regard, the cable member 34 is positioned around the particular tree trunk or other object to be climbed and its respective terminal end portions are cooperatively positioned and received within the frame members 24 until a tight or snug engagement is achieved as illustrated in FIG. 1. At this point, the appropriate opening 36 associated with each opposite end portion of the cable member 34 is aligned with a corresponding pair of openings 50 associated with one end portion of each respective frame member 24 and a corresponding pin member or other fastening means 48 is positioned through the aligned openings 50 and 36 to hold and lock the cable member 34 to the seat platform assembly 12 and to the tree trunk T to be climbed. In this regard, the pin members 48 may include a clip, clasp, or other projection means associated with its terminal end portion for holding the pin member 48 engaged with the cable member 34 and the respective frame member 24 in a locked position thereby preventing inadvertent removal or release of the respective pin members 48. It is likewise recognized and anticipated that other locking means other than pin members 48 can be utilized to securely hold the cable member 34 in its proper operative position around a tree trunk and engaged with the seat frame assembly 16 as just described. It is also recognized and anticipated that the flexible cable member 34 can be provided in any desired length depending upon the maximum diameter of a particular tree or other object to be climbed and that the opposite end portions of the cable member 34 may extend completely through the respective frame members 24. In this regard, although not necessary, it is preferred that each respective frame member 24 include a passageway extending completely therethrough.

The seat platform assembly 12 likewise includes a pair of pivotable or rotatable tree engaging members 52 and 54 as best illustrated in FIGS. 4 and 5, each tree engaging member including a plurality of teeth, jaws, a serrated edge, or other projection type members 56 for engaging and penetrating the bark of a tree such as the tree trunk T or other object to be climbed. The tree engaging members 52 and 54 are pivotally attached to the bottom portion of frame member 20 through the use of pivot pins 58 as best illustrated in FIG. 5. The pivotable or rotatable tree engaging members 52 and 54 are positioned and located on frame member 20 such that they can be moved or rotated between a first storage position wherein the teeth or jaws 56 associated with each respective member 52 and 54 are positioned inwardly towards the side frame assemblies 18, and a second operative position wherein the teeth or jaws 56 are positioned outwardly as illustrated in FIG. 4 for engagement with the object to be climbed. As best illustrated in FIG. 1, when the seat platform assembly 12 is positioned in its operative position adjacent the tree trunk T or other object to be climbed, the tree engaging members 52 and 56 are positioned in their operative second position such that the teeth or jaws 56 are positioned and located adjacent the tree trunk for engagement therewith. Engagement of the tree engaging members 52 and 56 with the object to be climbed further helps to hold and stabilize the seat platform assembly 12 to the tree trunk when positioned in its tree stand mode. Engagement of the tree engaging members 52 and 54 with the object to be climbed as well as the engagement of the flexible cable member 34 to both the tree trunk and the U-shaped frame assembly 16 enables the seat platform assembly 12 to be employed through leverage forces in its tree stand mode for both maneuvering the assembly 12 up and down the object to be climbed, and for stabilizing the assembly 12 at a desired elevation above the wildlife target area for use as a tree stand as will be hereinafter explained. The pivotable movement of the tree engaging members 52 and 54 enables a user to expose such members in their operative position only when the seat platform assembly 12 is ready for engagement to the object to be climbed, and allows a user to safely store such tree engaging members when the present device 10 is being used in its backpack mode or in its chair mode as will be hereinafter further explained. Although the tree engaging members 52 and 54 are shown as being pivotably rotatable between their first and second positions, it is also recognized and anticipated that the members 52 and 54 can likewise be moved linearly or in other directions so long as the members 52 and 54 can be moved into and out of their respective storage and operative positions.

Figure 6:
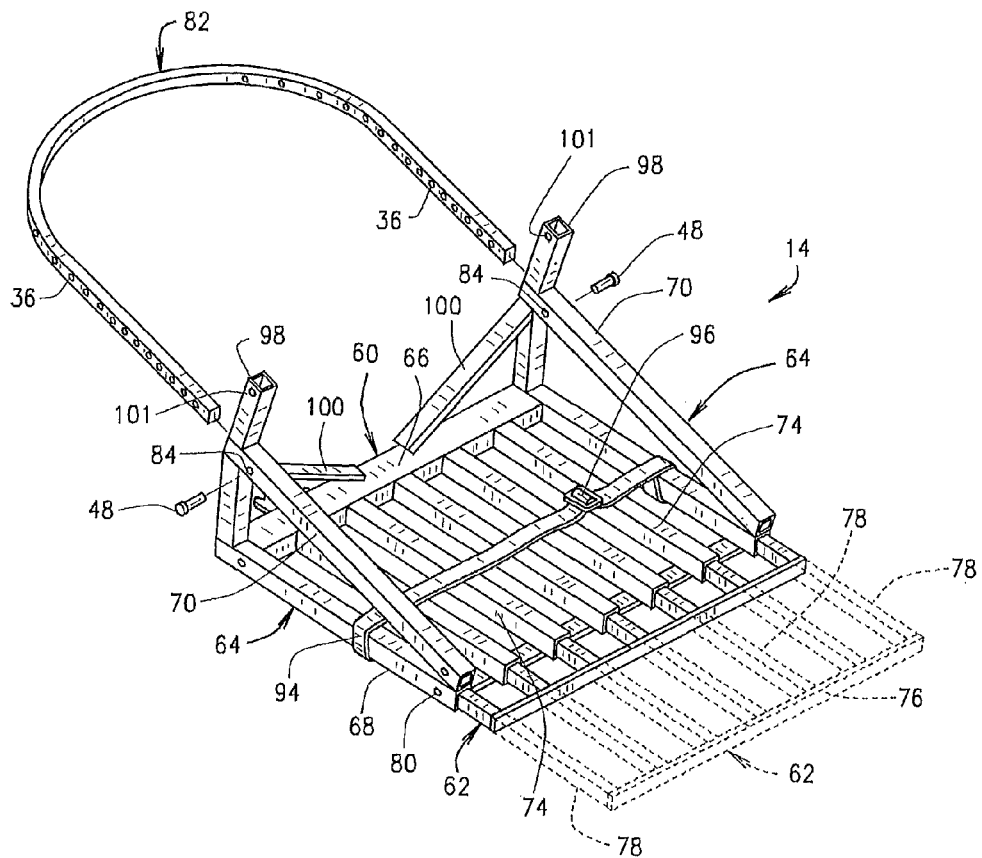
FIG. 6 is an exploded perspective view of the footbed assembly of the present climbing tree stand illustrated in FIG. 1 with the movement of telescoping footbed shown in dotted outline form.
Figure 7:
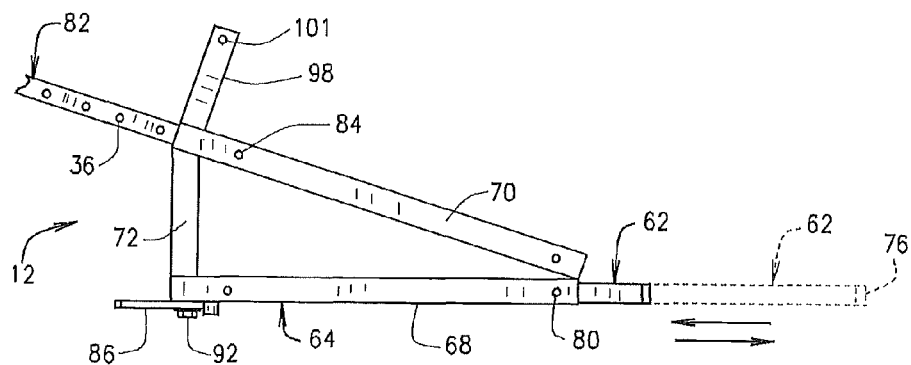
FIG. 7 is a side elevational view of the footbed assembly of FIG. 6.

The footbed assembly 14 of the present climbing tree stand 10 is best illustrated in FIGS. 6-9 and includes telescoping first and second frame members 60 and 62. The frame members 60 and 62 are telescopingly engageable with each other as best shown in FIGS. 6 and 7 such that the overall length of the footbed can be easily adjustable to accommodate the height, weight, build and stature of a user as will be hereinafter further explained. The frame member or assembly 60 includes a pair of spaced apart side frame assemblies 64 which are likewise somewhat triangular in shape and are constructed substantially similar to the side frame assemblies 18 of the seat platform assembly 12, the side frame assemblies 64 being likewise connected together through the use of a transverse frame member 66. Like side frame assemblies 18, the side frame assemblies 64 associated with footbed assembly 14 likewise include frame members 68, 70 and 72 positioned and located as illustrated in FIGS. 6, and 7. Like frame members 22 and 24, frame members 68 and 70 are likewise preferably hollow or include a passageway extending at least partially therethrough for receiving another flexible cable member and the telescoping footbed member 62 as will be hereinafter further explained. A plurality of substantially hollow members 74 are associated with frame assembly 60 and extend in a substantially parallel direction to frame members 68 between the respective side assemblies 64 and are attached at one end portion thereof to frame member 66. In similar fashion, telescoping frame assembly 62 includes end frame member 76 and a plurality of frame members 78 attached thereto, the frame members 78 being cooperatively telescopingly engageable with frame members 68 and 74 associated with frame assembly 60 as best illustrated in FIG. 6. When positioned in telescoping relationship with each other, the frame members 68 and 74 lie in alignment with frame members 78 to form continuations thereof, the frame assemblies 60 and 62 being slidably movable relative to each other to adjust the overall length of the footbed structure. This telescoping feature allows a user to conveniently adjust the overall length of the footbed to accommodate the user's size, weight, build and/or stature and to provide additional storage space for hunting and/or observing equipment carried by the user to the elevated tree stand 10. In this regard, the terminal end portions of each of the frame members 78 may include stop means or other similar mechanisms for preventing the frame assembly 62 from being completely retracted from frame assembly 60. In addition, the outside frame members 78 may include a plurality of spaced apart openings (not shown) any one of which can be placed in registration with a corresponding pair of openings associated with frame members 68 such as the openings 80 for positioning the telescoping footbed assembly 62 at a predetermined extension position and thereafter inserting a pin member such as pin member 48, a spring-loaded projection member, or other fastening means for holding the extended footbed assembly 62 at the selected extension position. It is also recognized and anticipated that the telescoping footbed assembly 62 can be completely removable from the frame assembly 60, or other known locking means may be utilized to hold the telescoping footbed assembly 62 at the selected extension position.

Like flexible cable member 34, a second flexible cable member 82 which is substantially identical to cable member 34 is utilized to attach the footbed assembly 14 to the tree trunk T or other object to be climbed as illustrated in FIG. 1. Like cable member 34, flexible cable member 82 likewise includes a plurality of spaced apart openings 36 associated with each respective opposite end portion thereof, the opposite end portions of the cable member 82 being similarly inserted and received into the passageway extending through respective frame members 70 for attaching the cable member 82 to the footbed assembly 60 and for adjusting the size of the cable member 82 for cooperatively engaging and encircling the tree trunk T or other object to be climbed as previously discussed with respect to seat platform assembly 12 and as illustrated in FIG. 1. Pin members 48 or other similar attachment and locking means can be utilized to attach the flexible cable member 82 to frame assembly 60, the pin members 48 being inserted through a pair of aligned openings 84 associated with one end portion of each of the frame members 70 when the openings 84 are positioned in alignment with any one of the openings 36 associated with cable member 82 as previously explained.

Like seat platform assembly 12, the footbed assembly 14 likewise includes a pair of pivotally movable tree engaging members 86 and 88 which are substantially identical to the tree engaging members 52 and 54 associated with seat platform assembly 14. Like members 52 and 54, the tree engaging members 86 and 88 likewise each include a plurality of teeth, jaws, a serrated edge, or other projection means 90 for engaging and penetrating the bark of a tree trunk T or other object to be climbed when positioned thereagainst as previously explained. The tree engaging members 86 and 88 are likewise pivotally attached to the bottom portion of support member 66 through the use of pivot pin members 92. Like tree engaging members 52 and 54, the tree engaging members 86 and 88 are likewise movable between a first storage position wherein the teeth or jaws 90 extend inwardly towards the telescoping footbed assembly 62, and a second operative position wherein the teeth or jaws 90 are exposed for engaging the object to be climbed when the footbed assembly is positioned adjacent such object as illustrated in FIG. 1. As explained with respect to seat platform assembly 14, engagement of both the tree engaging members 86 and 88 and the flexible cable member 82 with the tree trunk or other object to be climbed likewise stabilizes and attaches the footbed assembly 14 to the object to be climbed so that it can be used in a conventional climbing tree stand mode as previously explained with respect to seat platform assembly 12. Here again, it is recognized and anticipated that the tree engaging members 86 and 88 can move or travel in any direction between their respective storage and operative positions.

Figure 8:
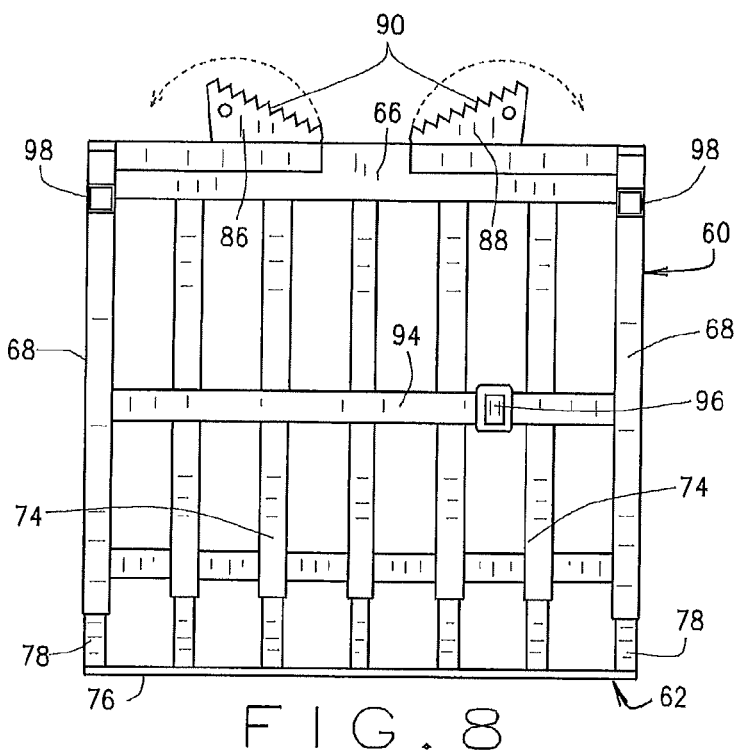
FIG. 8 is a top plan form view of the footbed assembly of FIGS. 6 and 7 without the flexible cable member showing the pivotable tree engaging members positioned in their operative tree engaging position.
Figure 9:
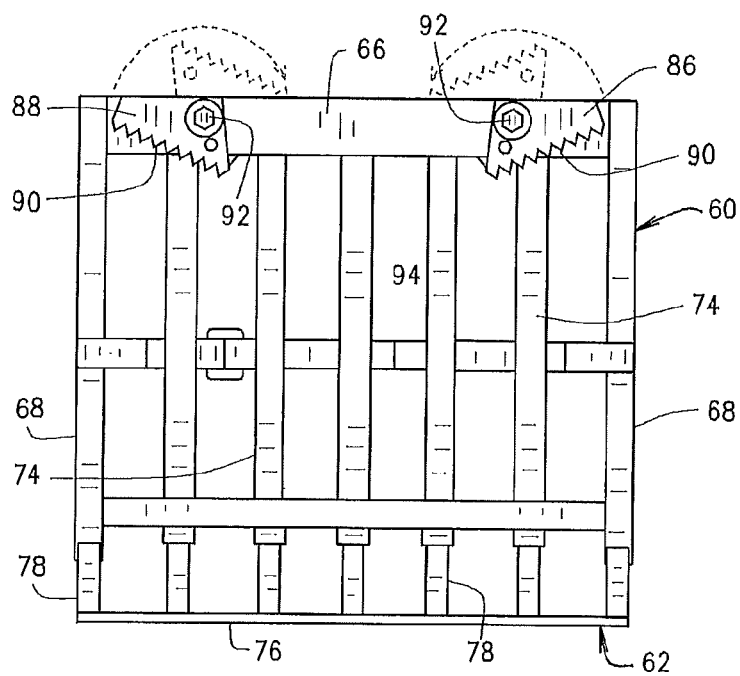
FIG. 9 is a bottom elevational view of the footbed assembly similar to FIG. 8 showing the pivotable tree engaging members positioned in their storage position.

The footbed assembly 14 likewise includes a strap member 94 as best illustrated in FIGS. 6, 8 and 9 for allowing a user to engage his/her feet to the footbed assembly 14 when using the present tree stand 10 in its climbing mode. Strap member 94 can be attached to frame assembly 60 in any conventional manner such as by permanently affixing the opposite end portions of strap member 94 to the respective side frame members 68, or by removably attaching the strap member 94 to frame assembly 60, or by using any other known attaching means. The strap member 94 includes an adjustment mechanism 96 in the form of a buckle whereby a user can tighten the strap member 94 over the top of his/her feet so as to securely hold a user's feet between the strap member 94 and the frame assembly 60. As will be hereinafter further explained, exerting pressure against both the strap member 94 and the footbed assembly 14 will enable a user to raise and/or lower the footbed assembly 14 adjacent the object to be climbed when the present tree stand 10 is used in its climbing tree stand mode. The frame assembly 60 likewise includes a pair of angularly oriented frame members 98 associated with the respective side assemblies 64 as best illustrated in FIGS. 6 and 7, the frame members 98 being substantially hollow or otherwise including a passageway or cavity extending therethrough for receiving the extension members 28 associated with seat platform assembly 12 when the present tree stand is used in either its backpack mode or its chair mode as will be hereinafter further explained. The frame assembly 60 may likewise include additional supporting or bracing members such as the members 100 illustrated in FIG. 6.

Although the present seat platform assembly 12 and footbed assembly 14 are illustrated in the accompanying drawings as being substantially rectangular or square tubular members, it is recognized and anticipated that the framework structure associated with both assemblies 12 and 14 can be made from any suitable material and that the individual frame members such as frame members 22-28, 68-78 and 98 can be fabricated from any suitable material and can take on any size and/or shape so long as appropriate cavities or passageways are associated therewith for receiving the telescoping portions of the present invention as well as for receiving the flexible cable members 34 and 82 as previously explained. It is also recognized and anticipated that the frame assemblies 16, 18, 60, 62 and 64 could be unitary in construction or the individual frame members associated respectively therewith could be welded or otherwise fastened together to achieve the desired structure and configuration.

As illustrated in FIG. 1, the present climbing tree stand 10 is appropriately attached and fastened to an object to be climbed such as the tree trunk T. The positioning and location of the seat platform assembly 12 and the footbed assembly 14 in FIG. 1 is how the respective assemblies will be positioned at the selected desired elevated position above the wildlife target area. In this regard, the respective assemblies 12 and 14 are positioned such that a user can comfortably sit on the seat platform assembly 12 and rest his/her feet on the footbed assembly 14. The seat platform assembly further includes a conventional seat cushion 30 which can be removably attached to the U-shaped seat frame assembly 16 in a conventional manner. In this regard, the seat cushion 30 could be a web-type seat member which includes straps such as strap members 31 and 33 for attaching the seat cushion 30 to the opposed side frame assemblies 18. In this particular configuration, the web members or strap members 31 and 33 support the weight of the user when seated on the seat cushion 30. Also, the seat cushion 30 could include a back portion such as seat back portion 35 (FIG. 1) so as to provide additional comfort to the user when leaning against the object so climbed. In this regard, seat back portion 35 may likewise include a removably attachable strap member 37 for securing the seat back portion 35 against the tree trunk or other object so climbed when the seat platform assembly 12 is positioned in its final elevated position. It is recognized and anticipated that various types of seat mechanisms and strap arrangements can be utilized with the present seat platform assembly 12 to provide a stable seat supporting structure for carrying the weight of a user when the seat platform assembly 12 is positioned at its final elevated position.

In addition, when the footbed assembly 14 is positioned at its final elevated position, the telescoping footbed assembly 62 can be extended from its fully retracted position within frame assembly 60 to a desired extension position to comfortably accommodate the feet of a user when seated on the seat platform assembly 12. Footbed extension assembly 62 allows a user to position his/her feet away from frame assembly 60 thereby providing additional storage space under seat platform assembly 12 and on frame assembly 60 for storing hunting and/or observing equipment carried by the user such as backpacks, camera cases, game calling equipment, thermos bottles, and other accessories used by the user when seated in the present tree stand 10 above the wildlife target area. Such additional equipment can likewise be stored on the extendable footbed assembly 62 depending upon the desire of the user and the type of equipment stored thereon.

Whenever a user approaches the particular tree or other object to be climbed, the seat platform assembly 12 and the footbed assembly 14 are separated from each other as will be hereinafter explained, and the user will attach the respective assemblies to the tree or other object to be climbed as previously explained. In this regard, the seat platform assembly 12 is positioned snugly against the object to be climbed with the tree engaging members 52 and 54 rotated or otherwise moved to their second operative position such that the teeth or jaws 56 associated therewith can engage and penetrate the object to be climbed. While holding the seat platform assembly 12 against the object to be climbed, the flexible cable member 34 is positioned around the trunk of the tree or other object to be climbed and is insertably positioned within the passageway associated with side frame members 24 as previously explained. The cable member 34 is then attached and locked into position on the seat platform assembly 12 using pin members 48 or other suitable means for holding the cable member 34 attached to the frame assembly 16. The seat platform assembly 12 so engaged with the object to be climbed is then slidably moved or shimmied up the object as far as possible based upon the arm reach of the user. If the cushion member 30 includes a back portion 35, the back portion 35 is folded down flat on top of seat portion 30 and the strap member 37 is not engaged with the object to be climbed until the seat platform assembly 12 reaches its final destination.

At this time, a user attaches the footbed assembly to the object to be climbed in a similar fashion as explained with respect to seat platform assembly 12 by likewise extending the tree engaging members 86 and 88 to their second operative position for engagement with the object to be climbed and by likewise attaching the flexible cable member 82 in an encircling fashion around the object to be climbed to the side frame members 70 as previously explained. To accomplish the climbing of the tree trunk T or other object to be climbed with the present tree stand 10, the feet of a user are placed under the strap member 94 and the strap member 94 is securely tightened across the feet of the user and the user grabs the extension members 28 associated with the seat platform assembly 12. In this regard, the extension members 28 are extended as desired by the user to serve as comfortable handle members for maneuvering the seat platform assembly 12 up the object to be climbed. The seat platform assembly 12 is then rotated slightly upwardly to disengage the tree engaging members 52 and 54 with the object to be climbed so that the seat platform assembly can be shimmied up the object as far as possible. The seat platform assembly is then pivoted downwardly until the flexible cable member 34 and the tree engaging members 52 and 54 again engage and grip the object to be climbed. As previously explained, the engagement of both the cable member 34 and the tree engaging members 52 and 54 hold the seat platform assembly 12 in a stable rigid position on the object to be climbed. At this point, the footbed assembly 14 is then shimmed or otherwise moved up the object to be climbed by lifting the body of the user with his/her feet under the strap 94 to pivot both the flexible cable member 82 and the tree engaging members 86 and 88 of the footbed assembly 14 away from the object to be climbed so that the flexible cable 82 may be slipped up the object into a new position. The footbed assembly 14 is then pressed against the object to be climbed such that both the flexible cable member 82 and the tree engaging members 86 and 88 will again engage the object and hold the footbed assembly 14 in place with the weight of the user resting thereon. This process is repeated to enable the user to climb the object or tree in successive steps using leverage forces to individually maneuver each respective assembly 12 and 14 up the object to be climbed.

Operation of the present tree stand 10 in its climbing mode to climb a particular object is conventional in nature and is well known in the art. Once the respective assemblies 12 and 14 are maneuvered to the desired elevated position, the assemblies are positioned as illustrated in FIG. 1 and the seat back portion 35, if used, is attached to the tree trunk T or other object so climbed. At this point, the user can release his/her feet from strap member 94 and maneuver his/her body so as to comfortably sit on cushion member 30 resting his/her feet on footbed assembly 14 as previously explained. In similar fashion, when it is time to descend to the ground, the respective assemblies 12 and 14 are likewise maneuvered down the object so climbed in reverse order using leverage forces to release and apply pressure to the respective tree engaging members and the respective flexible cable members associated with the assemblies 12 and 14.

Figure 10:
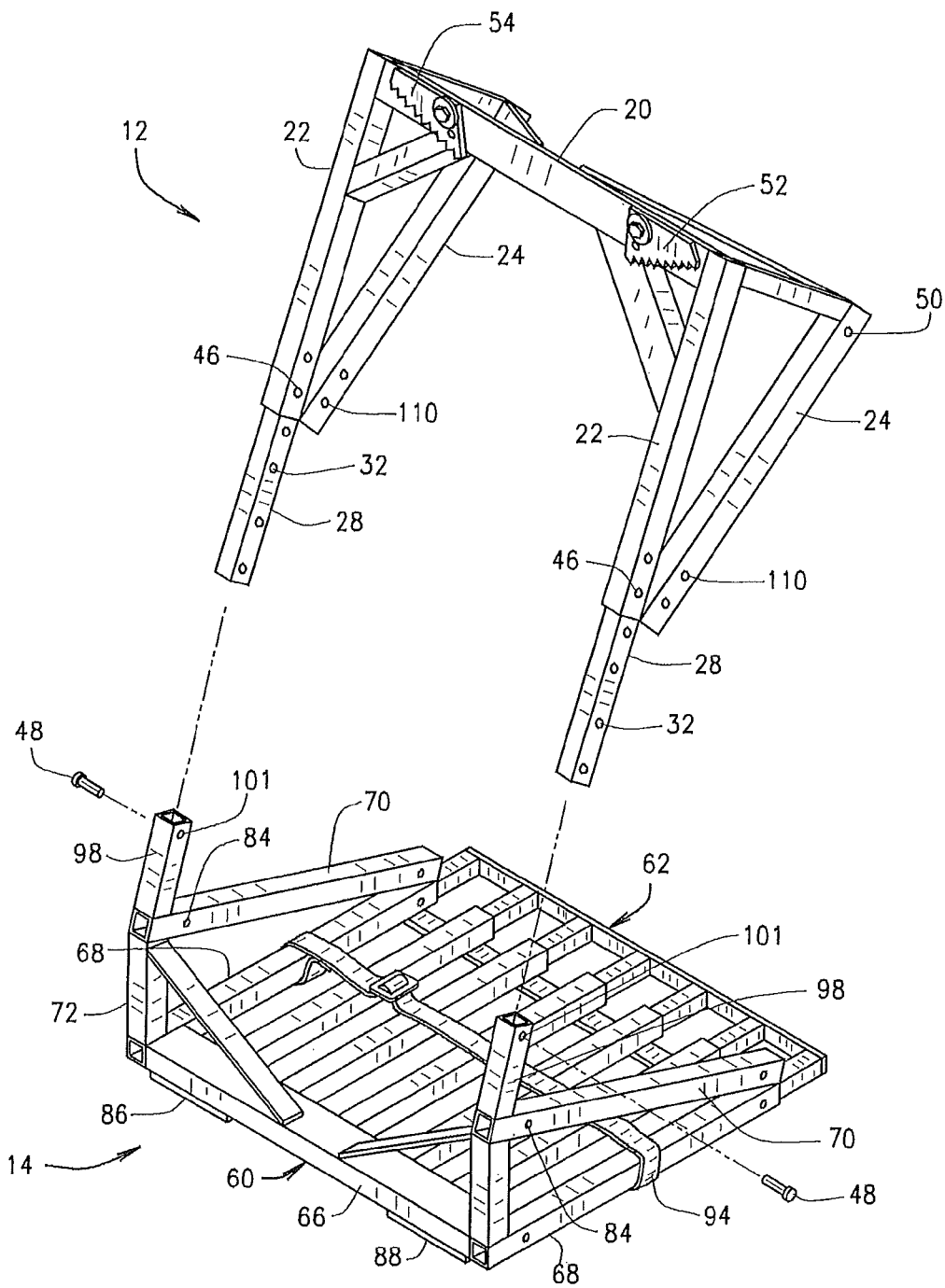
FIG. 10 is an exploded perspective view showing the present seat platform assembly and footbed assembly positioned for engagement to achieve the backpack mode in a first configuration.
Figure 11:
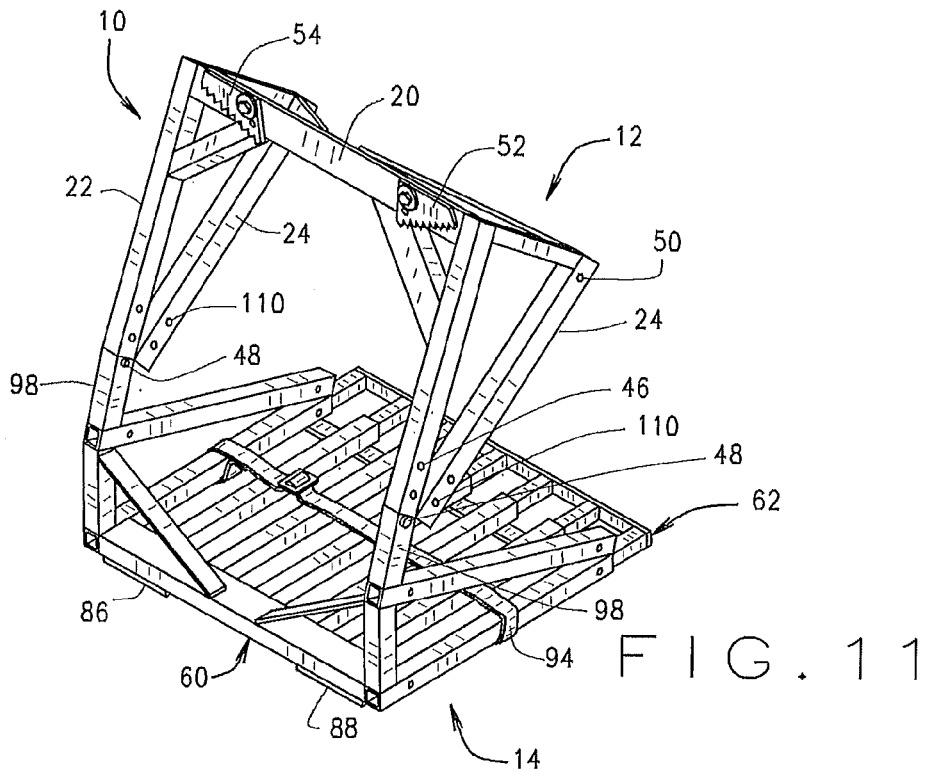
FIG. 11 is a perspective view similar to FIG. 10 showing the present seat platform assembly and footbed assembly engaged to achieve the backpack mode.
Figure 12:
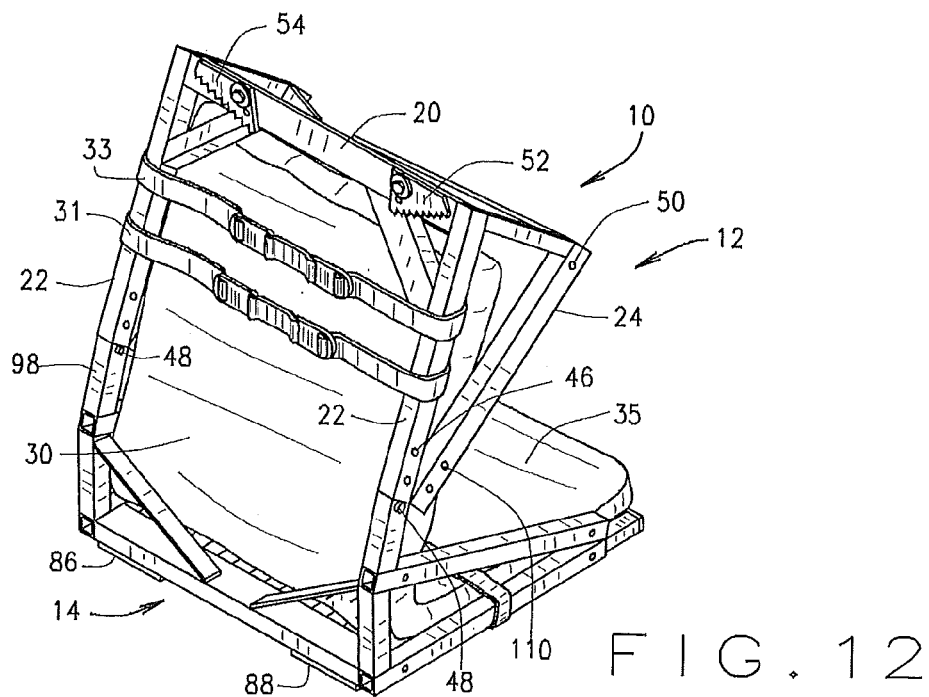
FIG. 12 is a perspective view similar to FIG. 11 showing a typical seat cushion positioned and attached to the present climbing tree stand in its backpack mode.

FIGS. 10-14 illustrate the assembly of the present seat platform assembly 12 and footbed assembly 14 into the backpack mode. As best illustrated in FIGS. 10 and 11, the tree engaging members 52 and 54 associated with the seat platform assembly 12 and the tree engaging members 86 and 88 associated with the footbed assembly 14 are maneuvered into their first storage position as indicated. The seat platform assembly 12 is then maneuvered as illustrated in FIG. 10 such that the tree engaging members 52 and 54 are positioned facing the back of a user as illustrated in FIGS. 10-14 and as will be hereinafter further explained. Extension members 28 are thereafter at least partially extended and locked into position as previously explained so as to telescopingly engage frame members 98 associated with footbed assembly 14. When the extension members 28 are engaged with frame members 98 as illustrated in FIG. 11, an additional pin member 48 or other fastening means is insertably positioned through a pair of aligned openings 101 associated with each respective frame member 98 and through any one of the corresponding openings 32 associated with extension members 28 to securely lock and fasten the seat platform assembly 12 in an upright position relative to footbed assembly 14. Because the extension members 28 are slidably movable within frame members 22 between a fully retracted position and a fully extended position, the extension members 28 can be positioned at any location therebetween thereby providing adjustability to the overall height of the seat platform assembly 12 relative to the footbed assembly 14 depending upon the type of backpack and equipment to be carried by the user. In this regard, the extension members 28 can be fully received within frame members 98 when attached thereto as illustrated in FIG. 11, or any one of the plurality of openings 32 associated with each respective extension member 28 can be aligned with the respective openings 101 associated with frame members 98 to provide additional height to the backpack mode configuration. When the two assemblies 12 and 14 are attached to each other as explained and illustrated in FIGS. 10 and 11, the assemblies 12 and 14 form the framework for attaching a backpack thereto and using the present tree stand 10 in its backpack mode as will be hereinafter explained. Once the two assemblies 12 and 14 are configured and attached to each other as illustrated in FIG. 11, the seat cushion 30 can be attached to the combined framework as illustrated in FIG. 12. In this regard, the seat cushion 30 is attached to the seat platform assembly 12 as previously explained through the use of removably attachable strap members 31 and 33. The seat back portion 35, if used, is then positioned under strap member 94 associated with footbed assembly 14. This arrangement holds the entire cushion mechanism in a secure position on the combined assembly.

Figure 13:
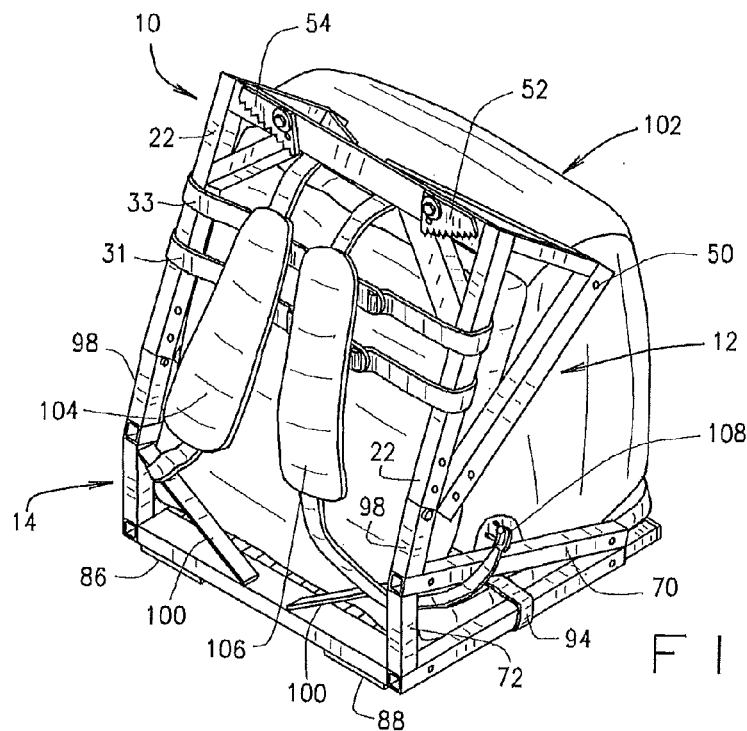
FIG. 13 is a perspective view similar to FIG. 12 showing a typical backpack positioned and attached to the present climbing tree stand in its backpack mode.
Figure 14:
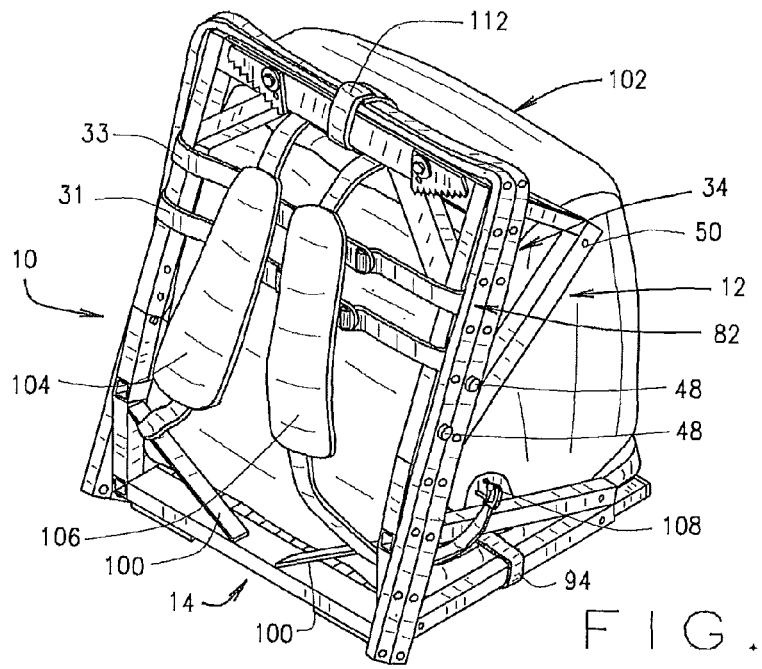
FIG. 14 is a perspective view similar to FIG. 13 but additionally showing the flexible cable members attached to the seat platform assembly for transport therewith.

As best illustrated in FIG. 13, a conventional backpack such as backpack 102 having a pair of conventional removably attachable shoulder straps 104 and 106 is then positioned and attached on the combined backpack mode frame assembly as illustrated in FIGS. 13 and 14. In this regard, in one embodiment, the shoulder straps 104 and 106 are positioned under frame member 20 and over and around frame members 100 and 70 such that a conventional clip member such as clip member 108 associated with the respective strap members 104 and 106 can be again attached to the backpack 102. By feeding the shoulder straps through the openings formed around and through the respective footbed assembly frame members 100, 70 and 72, the backpack 102 is securely fastened to the footbed assembly 14. Similarly, since the shoulder straps 104 and 106 are fed under frame member 20 associated with the seat platform assembly 12, the weight of the seat platform assembly is carried primarily by the footbed assembly 14 through the attachment of assembly 12 with the frame members 98 of assembly 14. In addition, depending upon the particular backpack being used, additional strap members as well as a waistband member typically associated with many backpacks can likewise be utilized to secure the backpack to the combined backpack mode framework by simply maneuvering these additional strap members through the combined framework.

Once the backpack 102 is securely fastened to the combined framework as shown in FIG. 13, the flexible cable members 34 and 82 can be likewise attached thereto as illustrated in FIG. 14 by wrapping the respective cable members around the framework as illustrated and attaching one cable member to the opposed side frame members 22 by again inserting a suitable pin member such as pin member 48 or other fastening means through any one of the openings 46 and through a corresponding opening 36 associated with that particular cable member, and attaching the other cable member to the opposed side frame members 24 by aligning any one of the openings 110 associated with each respective frame member 24 with any one of the openings 36 associated with the other flexible cable member and likewise inserting a pin member or other fastening means therethrough. The respective cable members 34 and 82 can likewise be firmly attached to the member 20 through the use of an additional strap member 112 as illustrated in FIG. 14. Once the seat platform assembly 12, the footbed assembly 14, the backpack 102, and the flexible cable members 34 and 82 are securely fastened together and configured as illustrated in FIG. 14, the present tree stand 10 is operable in its backpack mode to carry any equipment a user may need in the backpack 102, or otherwise attached to the combined backpack mode framework for carrying all such equipment into the wildlife target area. Once the shoulder straps 104 and 106 are positioned on a user, the entire assembly can be easily carried by the user through any type of environment to the selected wildlife target area.

Figure 17:
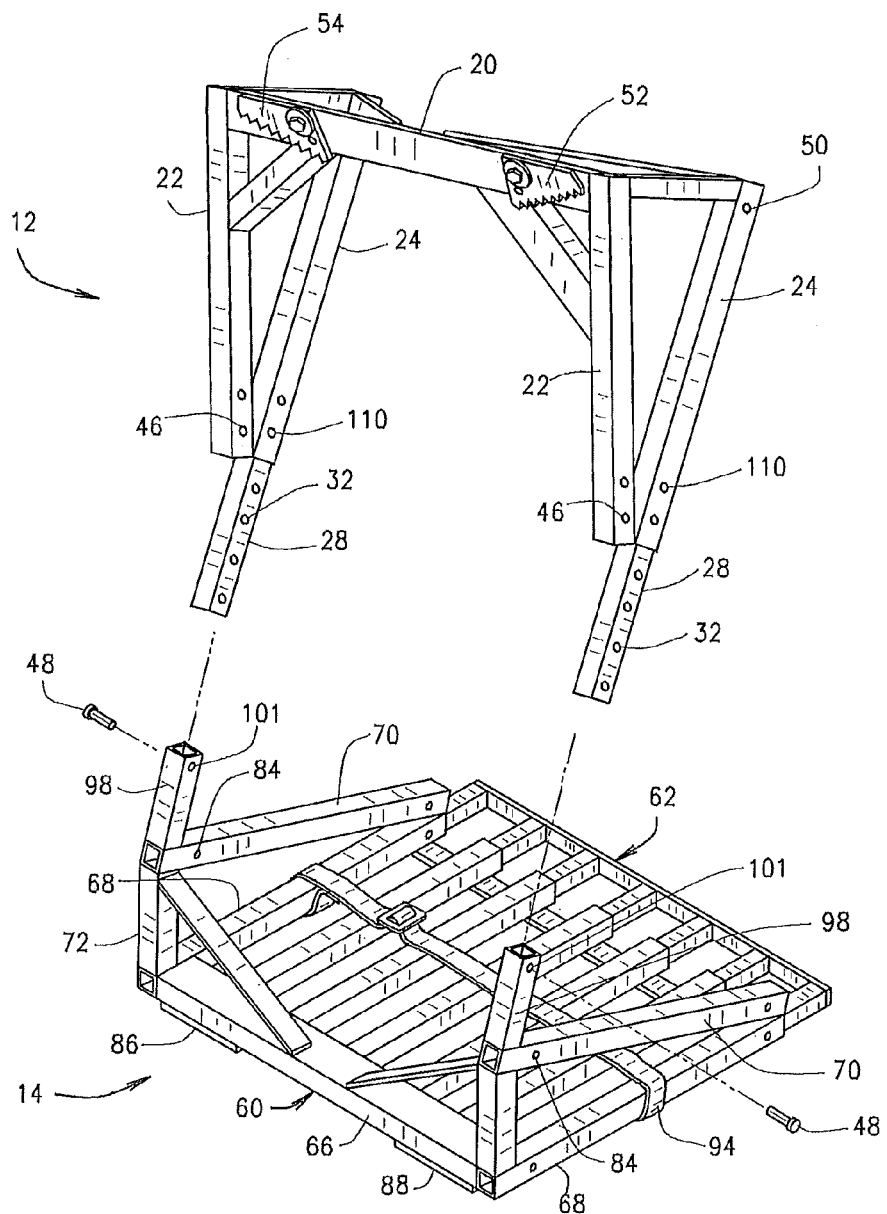
FIG. 17 is an exploded perspective view showing the present seat platform assembly and footbed assembly positioned for engagement to achieve the backpack mode in a second configuration.

Referring again to FIG. 10, if the extension members 28 associated with the seat platform assembly 12 are completely removable from frame members 22, such members can likewise be telescopingly received into frame members 24 and attached thereto as previously explained with respect to frame members 22 so as to change the angular orientation of the seat platform assembly 12 relative to the footbed assembly 14 when configured in the backpack mode. This second different angular orientation is illustrated in FIG. 17. This change in angular orientation gives the user additional flexibility to selectively change the angular orientation of the assemblies 12 and 14 relative to each other depending upon the type of equipment being carried into the selected wildlife target area, or depending upon the type and shape of the backpack being used. This adjustability provides additional comfort to the user and provides a smooth planar orientation of the seat platform assembly 12 relative to the back of a user carrying the same. In addition, the ability to position the seat platform assembly 12 in two different angular orientations relative to footbed assembly 14 allows a user to change the tilt of the footbed assembly when the present tree stand 10 is carried on a user's back in its backpack mode thereby helping to hold the equipment being carried thereon in its proper transport position. Regardless of the angular orientation of the seat platform assembly 12 in the backpack mode, this combined backpack frame assembly provides a suitable and comfortable support system for carrying the necessary equipment needed by the user as well as the present tree stand 10 to the selected target area. In addition, if a belt arrangement is associated with the selected backpack, such belt arrangement will encircle the waist of the user when the present invention is used in the backpack mode thereby providing additional support and security to the user when transporting the present tree stand and the user selected equipment to the wildlife target area. Once a user arrives at the selected target area, the various components of the present tree stand 10 can be disassembled from its backpack mode in reverse order as explained with respect to FIGS. 10-14, and the two separate assemblies 12 and 14 can then be engaged with the object to be climbed as previously explained with respect to FIG. 1.

FIGS. 15 and 16 illustrate use of the present tree stand 10 in its chair mode. When a user arrives at the selected wildlife target area, instead of using the present tree stand 10 in its conventional climbing tree stand mode as described above with respect to FIG. 1, the present tree stand 10 can be oriented, configured and assembled as illustrated in FIGS. 15 and 16 so as to be used in its chair mode as a hunting or observation chair at ground level. This configuration is particularly useful when turkey hunting as a turkey hunter will typically sit on the ground and lean up against a tree trunk at the selected turkey hunting area. Instead of sitting on the ground, on a cushion member, or on a backless stool or bucket, the present tree stand 10 when configured in its chair mode provides a more comfortable sitting arrangement since the present device 10 can be positioned on the ground against the base of a tree to provide a more comfortable and more stable sitting arrangement.

Figure 18:
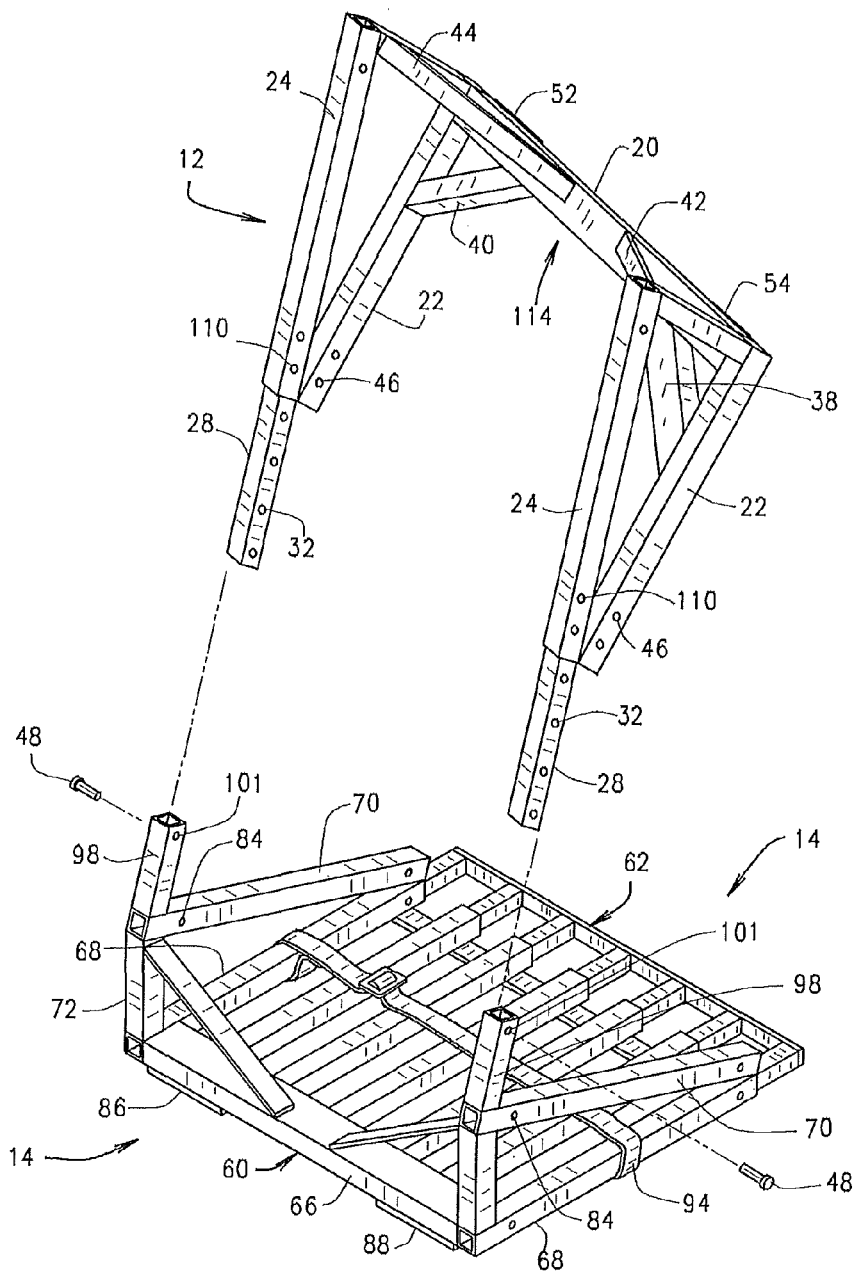
FIG. 18 is an exploded perspective view showing the present seat platform assembly and footbed assembly positioned in a second orientation for engagement to achieve the chair mode.

Once a user arrives at the wildlife or turkey target area and the seat platform assembly 12 and footbed assembly 14 are disassembled and separated from its backpack mode as previously explained, the assemblies 12 and 14 can be arranged and configured as illustrated in FIGS. 15 and 16 to achieve the chair mode. In this regard, the footbed assembly 14 is positioned on the ground in the same orientation as previously described with respect to the backpack mode illustrated in FIGS. 10-14. The seat platform assembly 12 is then rotated 180° from the backpack mode configuration illustrated in FIGS. 10-14 such that the tree engaging members 52 and 54, when in their first storage position, are positioned and located so as to face the telescoping footbed assembly 62 as best illustrated in FIG. 15. When so positioned as illustrated in FIG. 15, the seat platform assembly 12 is engaged with and attached to the footbed assembly 14 in the same manner as previously described with respect to the backpack mode, that is, the respective extension members 28 are engaged with the frame members 98 through use of the pin members 48 or other suitable attachment and locking means as previously described with respect to the backpack mode. Like the backpack mode configuration, the extension members 28 can likewise be removed from the opposed side frame members 22 and reengaged with the side frame members 24 as previously explained so as to engage the footbed assembly at a second different angular orientation as illustrated in FIG. 18. In addition, like the backpack mode configuration, the extension members 28 can likewise be selectively positioned at any one of a plurality of different extension positions when engaged with either frame members 22 and 24 so as to provide adjustability with respect to the overall height of the seat platform assembly 12 relative to the footbed assembly 14 when used in the chair mode. This adjustability both with respect to adjusting the overall height of the assembly 12 which forms the back portion of the chair in the chair mode and with respect to adjusting the angular orientation of the assembly 12 relative to the assembly 14 provides a user the ability to change both the angle of inclination of the back portion of the resulting chair as well as its overall height based upon the height, weight, build and/or stature of the user and/or based upon the orientation and/or inclination of the tree or other object against which the assembly 12 will be positioned. In this regard, the angular orientation of the support members 42 and 44 relative to frame member 20 and side frame assemblies 18 form an exaggerated V configuration 114 for cooperatively receiving the trunk of a tree, pole, or other substantially vertical object against which the chair mode configuration will be positioned. Depending upon the size of the tree or other object against which the chair mode configuration of the present invention will be positioned, the V-shaped configuration 114 provides additional support and stability to the overall assembly in its chair mode when so positioned against an object. Once the two assemblies 12 and 14 are assembled and connected together in the chair mode as illustrated in FIG. 16, the cushion member 30 including the optional cushion back portion 35 can again be attached to the combined chair mode framework as previously described with respect to the backpack mode illustrated in FIG. 12 to provide additional comfort to a user sitting in the chair mode configuration.

Although the chair configuration illustrated in FIG. 16 is designed for resting on the ground and leaning against a tree or other substantially vertical object, it is recognized and anticipated that the present chair mode configuration can be used separate and apart from leaning against any object and can be positioned on the ground at any location. When turkey hunting, the chair mode configuration will most likely be established on the ground on the edge of a field or open area concealed within a natural habitat or behind artificial camouflage material to conceal the movements of the hunter sitting on the present tree stand 10 in its chair mode. It is also recognized that the present tree stand 10 in its chair mode can likewise be used on the bank of a lake, river or stream for fishing, or for any other application where the user desires a comfortable seating arrangement. Other uses and applications are likewise envisioned and anticipated.

The present tree stand 10 therefore provides a user with a plurality of different options when hunting or observing wildlife. As illustrated in FIGS. 10-14 and 17, the seat platform assembly 12 and the footbed assembly 14 of the present invention can be arranged, configured and assembled in its backpack mode to enable a user to carry the tree stand 10 along with any necessary equipment on the user's back to the wildlife target area. Once the selected wildlife target area has been reached, the user can easily disassemble the present tree stand 10 from its backpack mode configuration and can then use the present tree stand 10 either in its conventional climbing tree stand mode, or in its chair mode depending upon the particular use and application of the user. When used in its conventional climbing tree stand mode, the seat platform assembly 12 and the footbed assembly 14 can be attached to the object to be climbed as illustrated in FIG. 1 and used as previously described. When used in its chair mode, the assemblies 12 and 14 can be configured as illustrated in FIGS. 15, 16 and 18 and the present tree stand 10 can be used as a comfortable seat arrangement for turkey hunting, wildlife observing, or any other suitable application as previously described.

In addition, the adjustability of the extension members 28 as well as the fact that the extension members 28 can be insertably cooperatively received within either opposed pairs of frame members 22 and 24 provides additional flexibility to a user to both adjust the overall height of assembly 12 relative to assembly 14 in both its backpack mode and its chair mode, and to angularly orient assembly 12 relative to assembly 14 in two different angular orientations in both the backpack mode and the chair mode depending upon the needs of the user. In addition, the telescoping footbed provides additional space and adjustability depending upon the height, weight, build and/or stature of the user and the pivotability or rotatable movement of the tree engaging members from their operative position to their stored position allows a user to safely store such members and the teeth or jaws associated respectively therewith when the assemblies 12 and 14 are configured in either their backpack mode or their chair mode. Once the particular hunt or wildlife observing has been concluded, the climbing tree stand mode and the chair mode configurations can be easily disassembled and the assemblies 12 and 14 can be easily reconfigured into the backpack mode for carrying not only the present tree stand 10 but also all of the associated equipment out of the wildlife target area to a second location.

It is also important to note that the overall dimensions of the various components and frame members associated with the assemblies 12 and 14 as well as the overall shape and configuration of these various members are likewise subject to wide variations and may be sized and shaped into a variety of different sizes and configurations so long as the interconnectability of the various components as discussed above in order to achieve the plurality of different utilization modes associated with the present tree stand 10 remain achievable. In addition, although it is generally preferred that all of the components and frame members comprising the assemblies 12 and 14 be constructed from a metal type material such as a metal tube stock, it is recognized that various other acceptable materials of construction are available and could likewise equally be employed to construct the various components of the present tree stand. In this regard, certain metal alloys, composite materials, wood and other materials could be utilized in the practice of the present invention. Still other variations and modifications to the various components comprising the present structures are also envisioned and contemplated.

Thus, there has been shown and described several embodiments of a novel climbing tree stand which is configurable to achieve a plurality of different utilization modes including a climbing tree stand mode, a backpack mode, and a chair mode, which structures fulfill all of the objects and advantages sought therefor. Many changes, modifications, variations, and other uses and applications of the present constructions will, however, become apparent to those skilled in the art after considering this specification and the accompanying drawings. All such changes, modifications, variations and other uses and applications, including all equivalents thereof, which do not depart from the spirit and scope of the present invention are deemed to be covered by the present invention which is limited only by the claims which follow.

What is claimed is:

1. A climbing tree stand enabling a user to climb a tree or other object to be climbed and for supporting a user at an elevated position above a ground on the object to be climbed, said tree stand being adaptable for use in a tree stand mode and in a backpack mode, said tree stand comprising:
a seat platform assembly, a footbed assembly, and a pair of first and second cable members, each of said first and second cable members having opposite end portions;
said seat platform assembly including a frame assembly for supporting a user's weight, said seat platform frame assembly including a first pair of opposed frame members for receiving the opposite end portions of said first cable member, a second pair of opposed frame members, said second pair of opposed frame members of said seat platform assembly being angularly related to said first pair of opposed frame members of said seat platform assembly, a first pair of tree engaging members, said first pair of tree engaging members being movable between a first storage position and a second operative position wherein said first pair of tree engaging members are positioned for selectively engaging a tree or other object to be climbed when said seat platform assembly is positioned thereagainst, said first cable member being positioned to at least partially encircle a tree or other object to be climbed and being adjustably attachable to said first pair of opposed frame members of said seat platform assembly, and a pair of extension members of said seat platform assembly, said extension members being telescopingly received within said second pair of opposed frame members, said extension members being movable between a fully retracted position and a fully extended position;
said footbed assembly including a frame assembly for supporting at least a user's feet, said footbed frame assembly having a first pair of opposed frame members for receiving the opposite end portions of said second cable member, a second pair of tree engaging members, said second pair of tree engaging members being movable between a first storage position and a second operative position wherein said second pair of tree engaging members are positioned for selectively engaging a tree or other object to be climbed when said footbed assembly is positioned thereagainst, said second cable member being positioned to at least partially encircle a tree or other object to be climbed and being adjustably attachable to said first pair of opposed frame members of said footbed assembly; and
said footbed assembly being adjustable to change an overall length thereof and further including a second pair of frame members for receiving the extension members associated with said seat platform assembly;
said seat platform assembly and said footbed assembly being attachable to each other in a first configuration for use in said backpack mode wherein said extension members associated with said seat platform assembly are cooperatively receivable within the second pair of frame members associated with said footbed assembly, said extension members being selectively adjustable between their fully retracted position and their fully extended position to vary an overall height of said seat platform assembly relative to said footbed assembly when said seat platform assembly is attached to said footbed assembly in said backpack mode;
said seat platform assembly and said footbed assembly being separately selectively attachable to a tree or other object to be climbed for use in said tree stand mode.

2. The climbing tree stand defined in claim 1 wherein said seat platform assembly includes a seat member.

3. The climbing tree stand defined in claim 1 wherein said first and second cable members include a plurality of spaced apart openings associated with each respective opposite end portions thereof, and wherein each of said first pairs of opposed frame members associated with each of said seat platform assembly and said footbed assembly includes at least one opening for placing in registration with any one of the plurality of openings associated with said first and second cable members for positioning said first and second cable members around a tree or object to be climbed and for adjustably attaching said cable members to said respective first pairs of opposed frame members associated with said seat platform assembly and said footbed assembly.

4. The climbing tree stand defined in claim 1 wherein said extension members function as handle members when received within said second pair of opposed frame members of said seat platform assembly when said tree stand is being used in said tree stand mode.

5. The climbing tree stand defined in claim 1 wherein the frame assembly associated with said footbed assembly includes first and second members, said first and second members of said footbed assembly being telescopingly engageable with each other whereby said first and second members can be moved relative to each other to change an overall length of said footbed assembly.

6. The climbing tree stand defined in claim 1 wherein said seat platform assembly and said footbed assembly are attachable to each other in a second different angular orientation for use in said backpack mode wherein said extension members associated with said seat platform assembly are telescopingly received within said first pair of opposed frame members associated with said seat platform assembly.

7. The climbing tree stand defined in claim 1 wherein said tree stand is further adaptable for use in a chair mode, said seat platform assembly being selectively attachable to said footbed assembly in a configuration different from the backpack mode configuration so as to form a chair positionable on a ground for enabling a user to sit in said chair.

8. The climbing tree stand defined in claim 7 wherein said seat platform assembly can be selectively attachable to said footbed assembly in said chair mode in at least two different angular orientations.

9. The climbing tree stand defined in claim 7 wherein said seat platform assembly is rotated 180° from the attachment to the said footbed assembly in said backpack mode and said extension members are cooperatively received within said second pair of frame members associated with said footbed assembly, said extension members being positionable at a plurality of different locations so as to vary a height of the seat platform assembly relative to the footbed assembly when attached thereto in said chair mode.

10. The climbing tree stand defined in claim 1 including a backpack having at least shoulder straps associated therewith, said backpack being removably attachable to said tree stand when said tree stand is configured in said backpack mode.

11. The climbing tree stand defined in claim 1 wherein said first and second tree engaging members each include a plurality of teeth associated therewith for engaging a tree or other object to be climbed when said first and second tree engaging members are positioned in their second operative position.

12. The climbing tree stand defined in claim 1 including an adjustable strap member associated with said footbed assembly for engaging a user's feet when said tree stand is used in said tree stand mode.

13. The climbing tree stand defined in claim 1 wherein said first and second cable members are removably attachable to said seat platform assembly when said tree stand is in said backpack mode.

14. A climbing tree stand for enabling a user to climb a tree or other substantially vertical object to be climbed and for supporting a user at an elevated position above a ground on the object to be climbed, said tree stand being adapted for use in a plurality of different utilization modes including a tree stand mode, a backpack mode and a chair mode, said tree stand comprising:

a seat platform assembly, a footbed assembly, and a pair of first and second cable members, each of said first and second cable members having opposite end portions;

said seat platform assembly including a frame assembly for supporting a user's weight, said seat platform frame assembly including a first pair of opposed frame members for receiving the opposite end portions of said first cable member, a first pair of tree engaging members, said first pair of tree engaging members being movable between a first storage position and a second operative position wherein said first pair of tree engaging members are positioned and located for selectively engaging a tree or other substantially vertical object to be climbed when said seat platform assembly is positioned thereagainst, said first cable member being positioned to at least partially encircle a tree or other substantially vertical object to be climbed and being adjustably attachable to said first pair of opposed frame members of said seat platform assembly, a second pair of opposed frame members angularly related to said first pair of opposed frame members of said seat platform assembly, and a pair of extension members, said extension members being telescopingly received within said second pair of opposed frame members of said seat platform assembly, said extension members being movable between a fully retracted position and a fully extended position;

said footbed assembly including a frame assembly for supporting at least a user's feet, said footbed frame assembly having a first pair of opposed frame members for receiving the opposite end portions of said second cable member, a second pair of tree engaging members, said second pair of tree engaging members being movable between a first storage position and a second operative position wherein said second pair of tree engaging members are positioned and located for selectively engaging a tree or other substantially vertical object to be climbed when said footbed assembly is positioned thereagainst, said second cable member being positioned to at least partially encircle a tree or other substantially vertical object to be climbed and being adjustably attachable to said first pair of opposed frame members of said footbed assembly; and said footbed assembly being adjustable to vary an overall length thereof and further including a second pair of frame members for receiving the extension members associated with said seat platform assembly;

said seat platform assembly and said footbed assembly being selectively attachable to each other in one configuration for use in said backpack mode wherein said extension members associated with said seat platform assembly are cooperatively receivable within the second pair of frame members associated with said footbed assembly, said extension members being selectively adjustable between their fully retracted position and their fully extended position to vary an overall height of said seat platform assembly relative to said footbed assembly when said seat platform assembly is attached to said footbed assembly in said backpack mode;

said seat platform assembly and said footbed assembly being selectively attachable to each other in another configuration for use in said chair mode wherein said seat platform assembly is rotated 180° from the attachment to said footbed assembly in said backpack mode and said extension members are cooperatively received within said second pair of frame members associated with said footbed assembly, said extension members being positionable at a plurality of different locations so as to vary a height of the seat platform assembly relative to the footbed assembly when attached thereto in said chair mode;

said seat platform assembly and said footbed assembly being separately selectively attachable to a tree or other substantially vertical object to be climbed for use in said tree stand mode.

15. The climbing tree stand defined in claim 14 wherein said seat platform assembly includes a seat member.

16. The climbing tree stand defined in claim 15 wherein the frame assembly associated with said seat platform assembly is substantially U-shaped in configuration having opposed side portions, and wherein said seat member is attached to the opposed side portions of said substantially U-shaped frame assembly.

17. The climbing tree stand defined in claim 14 wherein each of said first pair of opposed frame members associated with said seat platform assembly and with said footbed assembly for receiving the opposite end portions of said first and second cable members includes at least one opening extending therethrough, and wherein said first and second cable members include a plurality of spaced apart openings associated with each respective opposite end portion thereof, any one of said plurality of openings associated with the opposite end portions of each of said first and second cable members being positionable in registration with the at least one opening associated with each of said first pair of opposed frame members associated with said seat platform assembly and with said footbed assembly for adjustably positioning said first and second cable members at least partially around a tree or other substantially vertical object to be climbed and for adjustably attaching said cable members to said respective first pair of opposed frame members associated with said seat platform assembly and said footbed assembly.

18. The climbing tree stand defined in claim 17 wherein said respective first pairs of opposed frame members associated with said seat platform assembly and said footbed assembly for receiving the opposite end portions of said first and second cable members are tubular in structure.

19. The climbing tree stand defined in claim 14 wherein the frame assembly associated with said footbed assembly includes first and second members, said first and second members being arranged in telescoping relationship with each other so as to form an open grid configuration, said first and second members being movable relative to each other to change an overall length of said footbed assembly.

20. The climbing tree stand defined in claim 14 wherein said seat platform assembly and said footbed assembly are attachable to each other in a second different angular orientation for use in said backpack mode wherein said extension members associated with said seat platform assembly are telescopingly received within said first pair of opposed frame members associated with said seat platform assembly.

21. The climbing tree stand defined in claim 14 wherein said seat platform assembly and said footbed assembly are attachable to each other in a second different angular orientation for use in said chair mode wherein said extension members associated with said seat platform assembly are telescopingly received within said first pair of opposed frame members associated with said seat platform assembly.

22. The climbing tree stand defined in claim 14 including a backpack having at least two shoulder straps associated therewith, said backpack being removably attachable to said tree stand when said tree stand is configured in said backpack mode.

23. The climbing tree stand defined in claim 14 wherein said first and second pairs of tree engaging members are pivotally rotatable between their first storage position and their second operative position, said first and second tree engaging members each including a plurality of teeth associated therewith for engaging a tree or other substantially vertical object to be climbed when said first and second tree engaging members are positioned in their second operative position.

24. The climbing tree stand defined in claim 14 including an adjustable strap member associated with said footbed assembly for engaging a user's feet when said tree stand is used in said tree stand mode.

25. The climbing tree stand defined in claim 14 wherein said first and second cable members are removably attachable to said seat platform assembly when said tree stand is in said backpack mode.

26. The climbing tree stand defined in claim 14 wherein said seat platform assembly includes a V-shaped configuration associated with a portion thereof, said V-shaped configuration being positionable against a tree or other substantially vertical object when said seat platform assembly is attachable to said footbed assembly for use in said chair mode.

27. A climbing tree stand for enabling a user to climb a tree or other substantially vertical object to be climbed and for supporting a user at an elevated position above a ground on the object to be climbed, said tree stand being adapted for use in a plurality of different utilization modes including a tree stand mode, a backpack mode and a chair mode, said tree stand comprising:

a seat platform assembly, a footbed assembly, and a pair of first and second cable members, each of said first and second cable members having opposite end portions;

said seat platform assembly including a frame assembly for supporting a user's weight, said seat platform frame assembly including a first pair of opposed frame members for receiving the opposite end portions of said first cable member, a second pair of opposed frame members angularly related to said first pair of opposed frame members of said seat platform assembly, a first pair of tree engaging members, said first pair of tree engaging members being movable between a first storage position and a second operative position wherein said first pair of tree engaging members are positioned and located for selectively engaging a tree or other substantially vertical object to be climbed when said seat platform assembly is positioned thereagainst, said first cable member being positioned to at least partially encircle a tree or other substantially vertical object to be climbed and being adjustably attachable to said first pair of opposed frame members of said seat platform assembly, and a pair of extension members each having opposite end portions, said extension members being telescopingly received within said first and second pairs of opposed frame members of said seat platform assembly, said extension members being movable between a fully retracted position and a fully extended position;

said footbed assembly including a frame assembly for supporting at least a user's feet, said footbed frame assembly having a first pair of opposed frame members for receiving the opposite end portions of said second cable member, a second pair of tree engaging members, said second pair of tree engaging members being movable between a first storage position and a second operative position wherein said second pair of tree engaging members are positioned for selectively engaging a tree or other object to be climbed when said footbed assembly is positioned thereagainst, said second cable member being positioned to at least partially encircle a tree or other object to be climbed and being adjustably attachable to said first pair of opposed frame members of said footbed assembly; and said footbed assembly including a second pair of frame members for receiving the extension members associated with said seat platform assembly;

said seat platform assembly and said footbed assembly being selectively attachable to each other for use in said backpack mode when one end portion of said extension members are received within either of said first and second pairs of frame members associated with said seat platform assembly and the opposite end portion of said extension members are received within the second pair of frame members associated with said footbed assembly, said extension members being selectively adjustable between their fully retracted position and their fully extended position to vary an overall height of said seat platform assembly relative to said footbed assembly when said seat platform assembly is attached to said footbed assembly in said backpack mode;

said seat platform assembly and said footbed assembly being selectively attachable to each other in another configuration for use in said chair mode;

said seat platform assembly and said footbed assembly being separately selectively attachable to a tree or other substantially vertical object to be climbed for use in said tree stand mode.

28. A climbing tree stand for enabling a user to climb a tree or other substantially vertical object to be climbed and for supporting a user at an elevated position above a ground on the object to be climbed, said tree stand being adapted for use in a plurality of different utilization modes including a tree stand mode, a backpack mode and a chair mode, said tree stand comprising:

a seat platform assembly, a footbed assembly, and a pair of first and second cable members, each of said first and second cable members having opposite end portions;

said seat platform assembly including a frame assembly for supporting a user's weight, said seat platform frame assembly including a first pair of opposed frame members for receiving the opposite end portions of said first cable member, a second pair of opposed frame members angularly related to said first pair of opposed frame members of said seat platform assembly, a first pair of tree engaging members, said first pair of tree engaging members being movable between a first storage position and a second operative position wherein said first pair of tree engaging members are positioned and located for selectively engaging a tree or other substantially vertical object to be climbed when said seat platform assembly is positioned thereagainst, said first cable member being positioned to at least partially encircle a tree or other substantially vertical object to be climbed and being adjustably attachable to said first pair of opposed frame members of said seat platform assembly, and a pair of extension members each having opposite end portions, said extension members being telescopingly received within said first and second pairs of opposed frame members of said seat platform assembly, said extension members being movable between a fully retracted position and a fully extended position;

said footbed assembly including a frame assembly for supporting at least a user's feet, said footbed frame assembly having a first pair of opposed frame members for receiving the opposite end portions of said second cable member, a second pair of tree engaging members, said second pair of tree engaging members being movable between a first storage position and a second operative position wherein said second pair of tree engaging members are positioned for selectively engaging a tree or other object to be climbed when said footbed assembly is positioned thereagainst, said second cable member being positioned to at least partially encircle a tree or other object to be climbed and being adjustably attachable to said first pair of opposed frame members of said footbed assembly; and said footbed assembly including a second pair of frame members for receiving the extension members associated with said seat platform assembly;

said seat platform assembly and said footbed assembly being selectively attachable to each other in one configuration for use in said backpack mode;

said seat platform assembly and said footbed assembly being selectively attached to each other in another configuration for use in said chair mode when one end portion of said extension members are received within either of said first and second pairs of frame members associated with said seat platform assembly and the opposite end portion of said extension members are received within the second pair of frame members associated with said footbed assembly, said extension members being selectively adjustable between their fully retracted position and their fully extended position to vary an overall height of said seat platform assembly relative to said footbed assembly when said seat platform assembly is attached to said footbed assembly in said chair mode;

said seat platform assembly and said footbed assembly being separately selectively attachable to a tree or other substantially vertical object to be climbed for use in said tree stand mode.

* * * * *